US012705792B2

(12) United States Patent
Guo et al.

(10) Patent No.: US 12,705,792 B2
(45) Date of Patent: Aug. 11, 2026

(54) APPARATUS AND METHODS FOR IMPROVING DRIVER MONITORING SYSTEMS

(71) Applicant: QUALCOMM INCORPORATED, San Diego, CA (US)

(72) Inventors: Min Guo, San Diego, CA (US); Srinivasa Deevi, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 17/962,238

(22) Filed: Oct. 7, 2022

(65) Prior Publication Data

US 2024/0119627 A1 Apr. 11, 2024

(51) Int. Cl.
*G06T 7/73* (2017.01)

(52) U.S. Cl.
CPC ...... *G06T 7/74* (2017.01); *G06T 2207/20221* (2013.01); *G06T 2207/30196* (2013.01)

(58) Field of Classification Search
None
See application file for complete search history.

(56) References Cited

U.S. PATENT DOCUMENTS 6,474,159 B1 11/2002 Foxlin et al.
9,459,692 B1 * 10/2016 Li .......................... G01S 5/163
2002/0140562 A1 * 10/2002 Gutta .................... G08G 1/166 348/148
2004/0149036 A1 * 8/2004 Foxlin ................. G01C 21/166 702/94

(Continued)

FOREIGN PATENT DOCUMENTS

DE 102014206626 A1 * 10/2015 ............ G08B 21/06
DE 102018222265 A1 * 6/2020

(Continued)

OTHER PUBLICATIONS

Berg; The vehicle in-the-loop—a tool for the development and evaluation of safety-critical driver assistance systems; Dissertation; Department of Aerospace Engineering at the University of the Federal Armed Forces in Munich; 2014; Downloaded from http://athene-forschung.unibw.de/note?id=97267 (Year: 2014).*

(Continued)

*Primary Examiner* — Ian L Lemieux
(74) *Attorney, Agent, or Firm* — QUALCOMM Incorporated

(57) ABSTRACT

Methods, systems, and apparatuses to fuse a first dataset with a second dataset, and determine head pose estimation (s) based on the fused first dataset and second dataset. The first dataset may be associated with sensor data generated by a set of sensors of a first device, while the second dataset may be associated with sensor data generated by a first sensor of an apparatus. For example, an apparatus may obtain the first dataset and the second dataset. Additionally, the apparatus may generate a fused dataset based on the first dataset and the second dataset, and determine a head pose estimation of a head of the user based on the fused dataset. Further, the apparatus may output the third head pose estimation.

31 Claims, 11 Drawing Sheets

(56) References Cited

U.S. PATENT DOCUMENTS

| | | | | |
|---|---|---|---|---|
| 2015/0097864 | A1* | 4/2015 | Alaniz | G06F 3/04815 345/633 |
| 2015/0100179 | A1* | 4/2015 | Alaniz | G06F 3/011 701/1 |
| 2017/0277280 | A1* | 9/2017 | Peri | G06F 3/0304 |
| 2019/0171024 | A1* | 6/2019 | Tümler | G06F 3/012 |
| 2022/0058407 | A1* | 2/2022 | Yang | G06T 7/30 |
| 2022/0319041 | A1 | 10/2022 | Jiang et al. | |
| 2022/0319122 | A1* | 10/2022 | Kuehne | G10L 25/51 |

FOREIGN PATENT DOCUMENTS

| | | | | |
|---|---|---|---|---|
| WO | WO-2019149874 A1 * | 8/2019 | | G06F 3/012 |
| WO | 2021178980 A1 | 9/2021 | | |

OTHER PUBLICATIONS

Charissis, V., Falah, J., Lagoo, R., Alfalah, S. F., Khan, S., Wang, S., . . . & Drikakis, D. (2021). Employing emerging technologies to develop and evaluate in-vehicle intelligent systems for driver support: infotainment AR HUD case study. Applied Sciences, 11(4), 1397. (Year: 2021).*

Riegler, A., Riener, A., & Holzmann, C. (Nov. 2020). A research agenda for mixed reality in automated vehicles. In Proceedings of the 19th International Conference on Mobile and Ubiquitous Multimedia (pp. 119-131). (Year: 2020).*

Tan, Z., Dai, N., Su, Y., Zhang, R., Li, Y., Wu, D., & Li, S. (2021). Human-machine interaction in intelligent and connected vehicles: A review of status quo, issues, and opportunities. IEEE Transactions on Intelligent Transportation Systems, 23(9), 13954-13975. (Year: 2021).*

Haeling, J., Winkler, C., Leenders, S., Keßelheim, D., Hildebrand, A., & Necker, M. (Mar. 2018). In-car 6-dof mixed reality for rear-seat and co-driver entertainment. In 2018 IEEE Conference on Virtual Reality and 3D User Interfaces (VR) (pp. 757-758). IEEE . (Year: 2018).*

Murali, P. K., Kaboli, M., & Dahiya, R. (2021). Intelligent in-vehicle interaction technologies. Advanced Intelligent Systems, 4(2), 2100122. (Year: 2021).*

International Search Report and Written Opinion—PCT/US2023/074644—ISA/EPO—Dec. 5, 2023 (2204905WO).

Nidamanuri J., et al., "A Progressive Review: Emerging Technologies for ADAS Driven Solutions", IEEE Transactions on Intelligent Vehicles, 3rd Generation Partnership Project, Mobile Competence Centre, 650, Route Des Lucioles, F-06921 Sophia-Antipolis Cedex, France, vol. 7, No. 2, Oct. 26, 2021, XP011914250, pp. 326-341, ISSN: 2379-8858, DOI: 10.1109/TIV.2021.3122898, Section II and III.

* cited by examiner

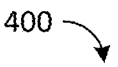

Obtain a first dataset indicating a first head pose estimation of a head of a user in each of a first set of images generated by a first device.
402

Obtain a second dataset indicating a second head pose estimation of the head of the user in each of a second set of images generated by a sensor of an apparatus.
404

Generate a fused dataset based on the first dataset and the second dataset.
406

Determine a third head pose estimate of the head of the user based on the fused dataset.
408

In response to determining the third head pose estimation of the head of the user determine content for display.
410

FIG. 4

APPARATUS AND METHODS FOR IMPROVING DRIVER MONITORING SYSTEMS

FIELD OF DISCLOSURE

The disclosed embodiments generally relate to driver monitoring systems.

BACKGROUND

Vehicles, such as autonomous vehicles, may include driver monitoring systems that, among other things, may enhance the driver's experience and/or safety within the cabin of the vehicle. In various examples, these driver monitoring systems may include a single monocular camera located within the cabin of the vehicle to monitor the driver and implement various operations that may enhance the driver's experience and/or safety within the cabin of the vehicle. However, in such examples, features and insights the driver monitoring system may derive or determine from two dimensional images captured by the single monocular camera may be lacking and inaccurate. As such, the driver's experience and/or safety within the cabin of the vehicle may be negatively affected.

SUMMARY

According to one aspect an apparatus may comprise a non-transitory, machine-readable storage medium storing instructions, and at least one processor coupled to the non-transitory, machine-readable storage medium. The at least one processor may be configured to obtain a first dataset indicating a first head pose estimation of a head of a user in each of a first set of images generated by a first device and obtain a second dataset indicating a second head pose estimation of the head of the user in each of a set of images generated by a first sensor of the apparatus. In some examples, the first dataset being based on sensor data of a set of sensors of the first device. Additionally, the at least one processor may be configured to generate a fused dataset based on the first dataset and the second dataset, and determine a third head pose estimation of the head of the user based on the fused dataset. Further, the at least one processor may be configured to output the third head pose estimation.

According to another aspect a non-transitory, machine-readable storage medium storing instructions that, when executed by at least one processor of a server, causes the at least one processor to perform operations that include obtaining a first dataset indicating a first head pose estimation of a head of a user in each of a first set of images generated by a first device and obtaining a second dataset indicating a second head pose estimation of the head of the user in each of a set of images generated by a first sensor of the apparatus. In some examples, the first dataset being based on sensor data of a set of sensors of the first device. Additionally, the operations may include generating a fused dataset based on the first dataset and the second dataset, and determining a third head pose estimation of the head of the user based on the fused dataset. Further, the operations may include outputting the third head pose estimation.

According another aspect, a computer-implemented method may include obtaining a first dataset indicating a first head pose estimation of a head of a user in each of a first set of images generated by a first device and obtaining a second dataset indicating a second head pose estimation of the head of the user in each of a set of images generated by a first sensor of the apparatus. In some examples, the first dataset being based on sensor data of a set of sensors of the first device. Additionally, the computer-implemented method may include generating a fused dataset based on the first dataset and the second dataset, and determining a third head pose estimation of the head of the user based on the fused dataset. Further, the computer-implemented method may include outputting the third head pose estimation.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 4 is a flowchart of an exemplary process 400 for fusing head pose data and pose data, in accordance with some exemplary embodiments.

Like reference numbers and designations in the various drawings indicate like elements.

DETAILED DESCRIPTION

Figure 1:
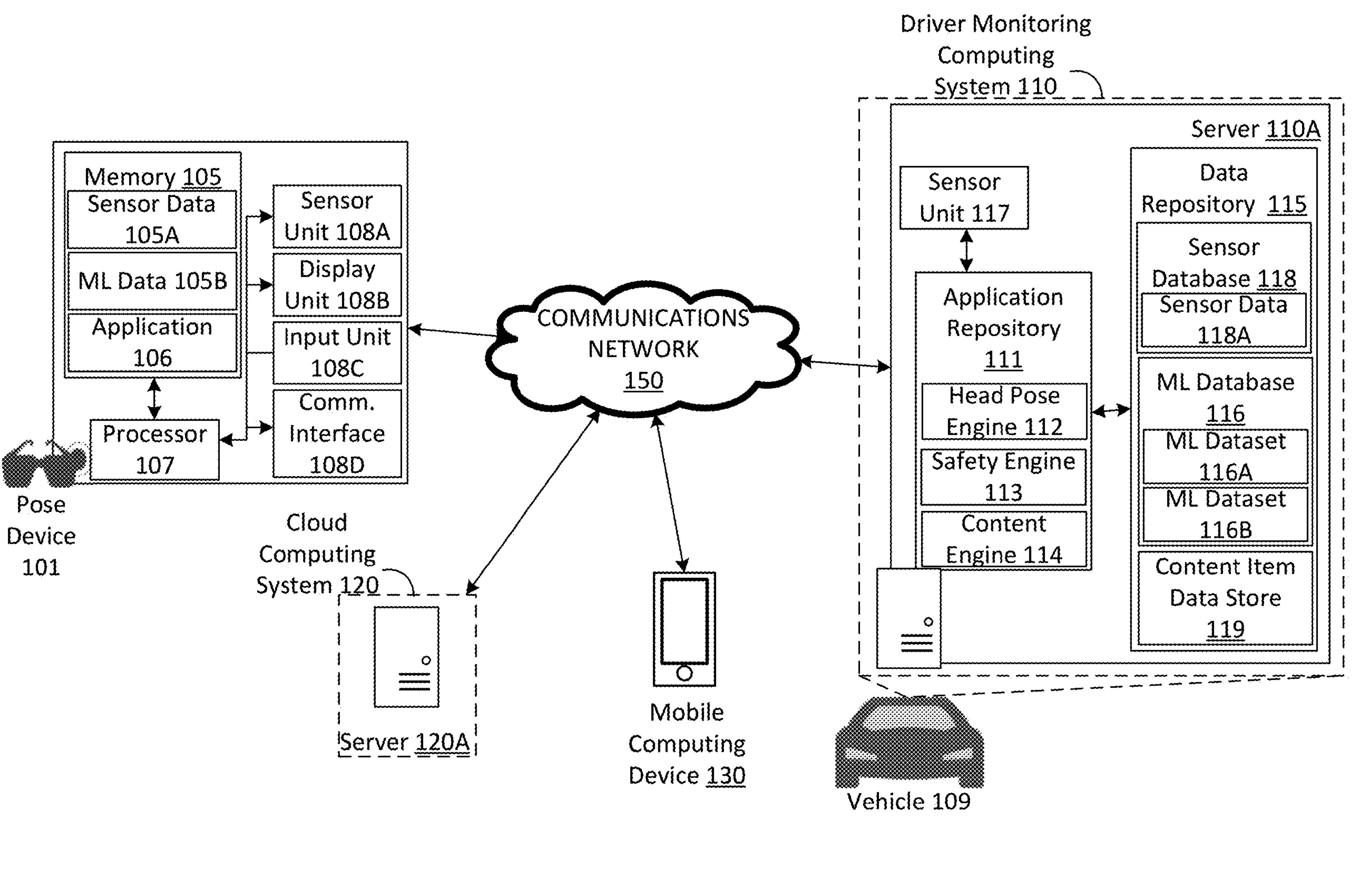
FIG. 1 is a block diagram of an exemplary computing environment, in accordance with some exemplary embodiments.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to a computing environment that includes a driver monitoring computing system and a pose device, such as a head mounted display (HMD) device, that may improve the head pose determination capabilities of the driver monitoring computing system. Such embodiments may enable the driver monitoring computing system to enhance its head pose determination capabilities, by utilizing data, such as measurements, generated by the pose device along with data, such as measurements, generated by a sensor, such a monocular camera, included with the driver monitoring system. In various implementations, the data/measurements generated by the pose device and the data/measurements generated by the sensor of the driver monitoring computing system, may be fused. The fused data/measurements may be more accurate than the data/measurements generated by the sensor of the driver monitoring computing system.

A. Exemplary Computing Environment

FIG. 1 illustrates a block diagram of an example computing environment 100 that includes, among other things, pose device 101, such as a head mounted display (HMD) device, driver monitoring computing system 110, cloud computing system 120, and mobile computing device 130. Each of the pose device 101, such as a head mounted display (HMD) device, driver monitoring computing system 110, cloud computing system 120, and mobile computing device 130 may be operatively connected to, and interconnected across, one or more communications networks, such as communications network 150. Examples of communications network 150 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Pose device 101 may have one or more tangible, non-transitory memories, such as memory 105, that store data and/or software instructions, and one or more processors, e.g., processor 107, configured to execute the software instructions. The one or more tangible, non-transitory memories may, in some aspects, store application programs, application engines or modules, and other elements of code executable by the one or more processors, such as, but not limited to, an executable web browser (e.g., Google Chrome, Apple Safari, etc.), and additionally or alternatively, an executable application, such as application 106, associated with an entity associated with cloud computing system 120. In some instances, not illustrated in FIG. 1, memory 105 may also include one or more structured or unstructured data repositories or databases, and pose device 101 may maintain one or more elements of device data within the one or more structured or unstructured data repositories or databases. For example, the elements of device data may uniquely identify pose device 101 within computing environment 100, and may include, but are not limited to, an Internet Protocol (IP) address assigned to pose device 101 or a media access control (MAC) layer assigned to pose device 101.

Pose device 101 may include multiple sensors that detect or measure a particular physical property of an object, such as if worn on a head of a user of pose device 101 the multiple sensors may measure a particular physical property of the head. As described herein, each of the multiple sensors may generate sensor data corresponding to such measurements (e.g., acceleration, position, orientation, and angular rates associated with the object, such as the head of the user). For example, as illustrated in FIG. 1, pose device 101 may include a sensor unit 108A that includes one or more sensors that each may be configured to detect and determine measurements associated with a position and/or orientation of an object, such as the head of the user of pose device 101, at a given time or over a time interval. Additionally, each of the multiple sensors of sensor unit 108A may be configured to generate, based on the measurements, corresponding sensor data 105A that indicates one or more measurements associated with a particular position or orientation of the object at the given time or time interval. In some instances, pose device 101 may store sensor data 105A in memory 105. Examples of sensors of sensor unit 108A include, but are not limited to, a gyroscope, an accelerometer, an inertial measurement unit, and any other type of sensor that may be configured to detect, measure, or generate sensor data that may be associated with a position and/or orientation of an object or utilized to determine the position and/or orientation of the object. In some examples, sensor unit 108 may include an optical sensor. In such examples, sensor data 105A generated by the optical sensor may include one or more images of an environment the optical sensor is in. Additionally, each of the one or more images may capture a particular scene at a particular point in time, and each scene may include one or more objects of the environment. In some instances, the optical sensor may be mounted on pose device 101. Additionally, in examples where pose device 101 is operated by a user, such as a driver of vehicle 109, the optical sensor may be positioned such as to have a forward-facing field of view (e.g., a field of view of what is in front of the user).

In some examples, pose device 101 may be a wearable computing device (e.g., a smart watch, a wearable activity monitor, wearable smart jewelry, and glasses and other optical devices that include optical head-mounted displays (OHMDs)) worn on a head of a user. In examples where pose device 101 is worn on a head of the user, such as a driver, each of the multiple sensors may detect and generate measurements associated with a position and/or orientation of the head of the user at a given time or time interval. Additionally, based on such measurements, each of the multiple sensors may be configured to generate sensor data, such as sensor data 105A, indicating the measurements associated with the position and/or orientation of the head of the user at the given time or time interval.

Additionally, pose device 101 may include a display unit, such as display unit 108B, configured to present interface elements to a corresponding user or driver, such as a user of pose device 101, and an input unit, such as input unit 108C, configured to receive input from the user (e.g., in response to the interface elements presented through the display unit). By way of example, the display unit may include, but is not limited to, an LCD display unit, a combiner display unit, or other appropriate type of display unit, and input unit 108C may include, but is not limited to, a keypad, keyboard, touchscreen, voice activated control technologies, or appropriate type of input unit. Further, in additional aspects (not illustrated in FIG. 1), the functionalities of the display unit and input unit may be combined into a single device, e.g., a pressure-sensitive touchscreen display unit that presents interface elements and receives input from a user, such as a driver from vehicle 109. In various instances, pose device 101 may include an embedded computing device (e.g., in communication with a smart textile or electronic fabric), and any other type of computing device that may be configured to store data and software instructions, execute software instructions to perform operations, and/or display information on an interface device or unit, such as display unit 108B.

Moreover, pose device 101 may include a communications interface, such as communications interface 108D, such as a wireless transceiver device, coupled to a processor of pose device 101, such as processor 107, and configured by the processor to establish and maintain communications with communications network 150 via one or more communication protocols, such as WiFi®, Bluetooth®, NFC, a cellular communications protocol (e.g., LTE®, CDMA®, GSM®, etc.), or any other suitable communications protocol. In some instances, pose device 101 may also establish communications with one or more additional computing systems or devices operating within computing environment 100 across a wired or wireless communications channel, such as communications network 150 (e.g., via the communications interface 108D using any appropriate communications protocol).

In some examples, pose device 101 may perform operations that determine a position or orientation of the object based on sensor data 105A generated by each of the multiple sensors of sensor unit 108A. In such examples, pose device 101 may deploy and utilize a trained localization machine learning process associated with object positioning and/or orientation determinations to determine a position and/or orientation of the object based on sensor data 105A generated by each of the multiple sensors of sensor unit 108A. In some instances, the trained localization machine learning process may be a simultaneous localization and mapping (SLAM) process. In such instances, pose device 101 may deploy and utilize the trained localization machine learning process to determine a pose estimation (e.g., a position and/or orientation) of an object that each sensor of sensor unit 108A may be measuring (e.g., sensor data 105A). Additionally, pose device 101 may generate pose data indicating the determined position and or orientation of the object.

By way of example, pose device 101 may be a wearable computing device, such as a HMD device, worn on the head of the user of pose device 101, such as a driver of vehicle 109. Additionally, multiple sensors of sensor unit 108A may generate sensor data 105A. As described herein, sensor data 105A may include at least an image of an environment the driver is or was in at a particular point in time. The at least one image may be captured by a sensor, such as an optical sensor of sensor unit 108A. Additionally, sensor data 105A may include gyroscope data generated by another sensor, such as a gyroscope sensor, of sensor unit 108A and/or IMU data generated by yet another sensor, such as an IMU, of sensor unit 108A. Both the gyroscope data and the IMU data may be generated or captured by the corresponding sensor at the particular time.

Moreover, processor 107 of pose device 101 may execute the SLAM process, and apply the SLAM process to sensor data 105A to determine a head pose or head pose estimation (e.g., a position and/or orientation) of the head of the driver at the particular time. Further, the SLAM process may generate pose data indicating one or more determined head poses or positions and/or orientations of the head of the driver, based on the application of the SLAM process to the sensor data 105A. Each of the one or more determined head poses may be associated with a particular image captured or generated by a sensor, such as an optical sensor of sensor unit 108A, at a particular point in time. Additionally, each of the one or more determined head poses may be associated with corresponding portions of other sensor data 105A, such as gyroscope data and/or IMU data, generated or captured by other sensors, such as a gyroscope sensor of sensor unit 108A and/or IMU of sensor unit 108A, at the particular point in time.

In some examples, processing resources of pose device 101 may be limited. As such, a trained localization machine learning process, such as a SLAM process, deployed on pose device 101 may result in high latency. In such examples, the trained localization machine learning process may be deployed on another computing system, such as cloud computing system 120 and/or mobile computing device 130. For instance, pose device 101 may transmit to cloud computing system 120 and/or mobile computing device 130 sensor data, such as sensor data 105A, generated by the multiple sensors of sensor unit 108A. Additionally, one or more servers of cloud computing system 120 and/or one or more processors of mobile computing device 130 may execute the trained localization machine learning process. Moreover, the one or more servers of cloud computing system 120 and/or one or more processors of mobile computing device 130 may apply the trained localization machine learning process to sensor data 105A to determine and generate data, such as pose data, indicating one or more determined head poses or positions and/or orientations of the head of the driver, based on the application of the trained localization machine learning process to sensor data 105A. In some instances, cloud computing system 120 may include one or more servers or databases, such as server 120A. Additionally, one or more servers of cloud computing system 120 may include a number of cloud entities (e.g., virtual machines, hypervisors, subnets, volumes, assigned IPs, projects, etc.). Further, in some examples, mobile computing device 130 may be a cellular phone, a smart phone, a tablet, a personal assistant device, a voice assistant device, a digital assistant, a laptop, a computer, or any other suitable device. In such examples, the user or driver may operate mobile computing device 130.

In instances where cloud computing system 120 deploys the trained localization machine learning process, such as the SLAM process as described herein, cloud computing system 120 may utilize the trained localization machine learning process to determine a position or orientation of an object based on sensor data 105A generated by each of the multiple sensors of sensor unit 108A. In such instances, cloud computing system 120 may obtain or receive, from pose device 101 and over communications network 150, sensor data 105A of each of the multiple sensors of sensor unit 108A. For instance, cloud computing system 120, such as server 120A, may perform operations that executes a SLAM process. Additionally, cloud computing system 120, may perform operations that obtain or receive, from pose device 101 and over communications network 150, sensor data 105A of each of the multiple sensors of sensor unit 108A. As described herein, sensor data 105A may include at least an image of an environment the driver, where the image is captured or generated by a sensor, such as an optical sensor of sensor unit 108A, at a particular point in time. Additionally, sensor data 105A may include gyroscope data generated by another sensor, such as a gyroscope sensor, of sensor unit 108A and/or IMU data generated by yet another sensor, such as an IMU, of sensor unit 108A. Both the gyroscope data and the IMU data may be generated or captured by the corresponding sensor at the particular time. Moreover, cloud computing system 120 may apply the SLAM process to sensor data 105A to determine a position and/or orientation of the object at a particular time or over a particular time interval. Further, cloud computing system 120 may generate pose data indicating one or more determined positions and/or orientations of the object based on such applications. As described herein, each of the one or more determined orientations and/or positions may be associated with a particular image captured or generated by a sensor, such as an optical sensor, of sensor unit 108A, at a particular point in time. Additionally, each of the one or more determined head poses may be associated with corresponding portions of other sensor data 105A, such as gyroscope data and/or IMU data, generated or captured by other sensors, such as a gyroscope sensor of sensor unit 108A and/or IMU of sensor unit 108A, at the particular point in time.

In instances where mobile computing device 130 deploys the trained localization machine learning process, such as the SLAM process described herein, mobile computing device 130 may utilize the trained localization machine learning process to determine a position or orientation of an object based on sensor data 105A generated by each of the multiple sensors of sensor unit 108A. In such instances, mobile computing device 130 may obtain or receive, from pose device 101 and over communications network 150, sensor data 105A of each of the multiple sensors of sensor unit 108A. For instance, mobile computing device 130 may perform operations that execute a SLAM process. Additionally, mobile computing device 130, may perform operations that obtain or receive, from pose device 101 and over communications network 150, sensor data 105A of each of the multiple sensors of sensor unit 108A. As described herein, sensor data 105A may include at least an image of the environment of the driver, where the image is captured or generated by a sensor, such as an optical sensor of sensor unit 108A, at a particular point in time. Additionally, sensor data 105A may include gyroscope data generated by another sensor, such as a gyroscope sensor, of sensor unit 108A and/or IMU data generated by yet another sensor, such as an IMU, of sensor unit 108A. Both the gyroscope data and the IMU data may be generated or captured by the corresponding sensor at the particular time. Moreover, mobile computing device 130 may apply the SLAM process to sensor data 105A to determine a position and/or orientation of the object at a particular time. Further, mobile computing device 130 may generate pose data indicating one or more determined positions and/or orientations of the object, based on such applications. As described herein, each of the one or more determined orientations and/or positions may be associated with a particular image captured or generated by a sensor, such as an optical sensor, of sensor unit 108A, at a particular point in time. Additionally, each of the one or more determined head poses may be associated with corresponding portions of other sensor data 105A, such as gyroscope data and/or IMU data, generated or captured by other sensors, such as a gyroscope sensor of sensor unit 108A and/or IMU of sensor unit 108A, at the particular point in time.

Driver monitoring computing system 110 may include one or more servers, such as server 110A, and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of driver monitoring computing system 110 may include server 110A having one or more processors configured to execute portions of the stored code, application engines or modules, or application programs maintained within the one or more tangible, non-transitory memories.

In some instances, driver monitoring computing system 110 may correspond to a discrete computing system, although in other instances, driver monitoring computing system 110 may correspond to a distributed computing system having multiple, computing components distributed across an appropriate computing network, such as communications network 150 of FIG. 1, or those established and maintained by one or more cloud-based providers, such as Microsoft Azure, Amazon Web Services™, or another third-party, cloud-services provider. Further, driver monitoring computing system 110 may also include one or more communications interfaces, such as one or more wireless transceivers, coupled to the one or more processors for accommodating wired or wireless internet communication across communications network 150 with other computing systems and devices operating within computing environment 100 (not illustrated in FIG. 1).

In some examples, driver monitoring computing system 110 may be part of or included in a vehicle, such as vehicle 109. Additionally, driver monitoring computing system 110 may perform one or more processes to monitor a driver operating vehicle 109 and determine one or more head poses or head pose estimations of the driver. Referring to FIG. 1, to facilitate the performance of one or more of these exemplary processes, driver monitoring computing system 110 may include sensor unit 117. Sensor unit 117 may include an optical sensor, such as a monocular camera. In some examples, the optical sensor may be mounted within a vehicle, such as vehicle 109, and the field of view of the optical sensor may include one or more portions of the cabin of the vehicle where the driver is to be seated. In such examples, the optical sensor may be configured to generate sensor data 118A that includes one or more images of the one or more portions of the cabin of the vehicle where the driver is to be seated. In some instances, the one or more images may include the head of the driver. In other instances, as illustrated in FIG. 1, driver monitoring computing system 110 may maintain within the one or more tangible, non-transitory memories, data repository 115 that includes, but is not limited to, sensor database 118. Sensor database 118 may store sensor data generated by sensor unit 117, such as sensor data 118A of the optical sensor of sensor unit 117.

Further, as illustrated in FIG. 1, driver monitoring computing system 110 may maintain a trained localization machine learning process, such as a three-dimensional morphable model (3DMM). The trained localization machine learning process may process sensor data 118A to determine a position and/or orientation of a head of the driver in each of the one or more images of sensor data 118A. In some examples, driver monitoring computing system 110 may, based on such determinations, generate head pose data indicating the determined position and/or orientation of the head of the driver operating the vehicle in each of the one or more images of sensor data 118A. To facilitate the performance of any of the exemplary processes described herein, driver monitoring computing system 110 may maintain within the one or more tangible, non-transitory memories, data repository 115 that includes, but is not limited to, machine learning (ML) database 116. As illustrated in FIG. 1, ML database 116 may store a ML dataset 116A of the trained localization machine learning processes, such as the 3DMM process. Additionally, driver monitoring computing system 110 may deploy trained localization machine learning processes in accordance with the corresponding ML dataset 116A. As described herein, ML dataset 116A may include one or more model parameters (e.g., hyperparameters) of the trained localization machine learning processes. Driver monitoring computing system 110 may establish the trained machine learning process based on the model parameters of the ML dataset 116A. As described herein, driver monitoring computing system 110 may establish and execute the trained machine learning process to determine a positioning and or orientation of an object, such as a head pose of a head of a driver, identified in each of one or more images of sensor data 118A.

For example, and to facilitate the performance of any of the exemplary processes described herein, driver monitoring computing system 110 may include server 110A that may maintain within the one or more tangible, non-transitory memories, an application repository 111. Application repository 111 may include, among other things, head pose engine 112. Head pose engine 112 may be executed by the one or more processors of server 110A to obtain, from ML database 116, ML dataset 116A of the trained localization machine learning process. Additionally, executed head pose engine 112 may deploy and apply the trained localization machine learning process to sensor data 118A of sensor unit 117, in accordance with one or more parameters of corresponding ML dataset 116A. Based on such an application, the trained localization machine learning process may generate head pose data. The head pose data may indicate a head pose (e.g., position or orientation) in each of the one or more images of the sensor data, such as sensor data 118A.

In some examples, a trained localization machine learning process, such as a 3DMM process deployed on driver monitoring computing system 110, may be deployed on another computing system, such as cloud computing system 120 and/or mobile computing device 130. In such examples, the processing resources that driver monitoring computing system 110 may have utilized to deploy the trained localization machine learning process may now be redirected to other processes (e.g., enhancing the driver's experience within the cabin of the vehicle based on the head pose data, pose data or fused head pose dataset). In some instances, driver monitoring computing system 110 may transmit to cloud computing system 120 and/or mobile computing device 130 sensor data, such as sensor data 118A, generated by the multiple sensors of sensor unit 117. Additionally, one or more servers, such as server 120A, of cloud computing system 120 and/or one or more processors of mobile computing device 130 may execute the trained localization machine learning process. Moreover, the one or more servers of cloud computing system 120 and/or one or more processors of mobile computing device 130 may apply the trained localization machine learning process to sensor data 118A to determine and generate data, such as head pose data, indicating one or more determined head poses or positions and/or orientations of the head of the driver, based on the application of the trained localization machine learning process to sensor data 118A.

In instances where cloud computing system 120 deploys the trained localization machine learning process, such as the 3DMM process as described herein, cloud computing system 120 may utilize the trained localization machine learning process to determine a position or orientation of an object based on sensor data 118A generated by a sensor, such as an optical sensor, of sensor unit 117. In such instances, cloud computing system 120 may obtain or receive, from driver monitoring computing system 110 and over communications network 150, sensor data 118A of the sensor of sensor unit 117. For instance, cloud computing system 120, such as server 120A, may perform operations that executes a 3DMM process. Additionally, cloud computing system 120, may perform operations that obtain or receive, from driver monitoring computing system 110 and over communications network 150, sensor data 118A of the sensor of sensor unit 117. As described herein, the sensor data 118A may include one or more images of the one or more portions of the cabin of the vehicle where the driver is to be seated. In some instances, the one or more images may include the head of the driver. Moreover, cloud computing system 120 may apply the 3DMM process to sensor data 118A to determine a position and/or orientation of the head of the driver at a particular time or over a particular time interval. Further, cloud computing system 120 may generate head pose data based on such applications. The head pose data may indicate a head pose (e.g., position or orientation) in each of the one or more images of the sensor data, such as sensor data 118A.

In instances where mobile computing device 130 deploys the trained localization machine learning process, such as the 3DMM process described herein, mobile computing device 130 may utilize the trained localization machine learning process to determine a position or orientation of an object based on sensor data 118A generated by a sensor, such as an optical sensor, of sensor unit 117. In such instances, mobile computing device 130 may obtain or receive, from driver monitoring computing system 110 and over communications network 150, sensor data 118A of the sensor of sensor unit 117. For instance, mobile computing device 130 may perform operations that execute a 3DMM process. Additionally, mobile computing device 130, may perform operations that obtain or receive, from driver monitoring computing system 110 and over communications network 150, sensor data 118A of the sensor of sensor unit 117. As described herein, the sensor data 118A may include one or more images of the one or more portions of the cabin of the vehicle where the driver is to be seated. In some instances, the one or more images may include the head of the driver. Moreover, mobile computing device 130 may apply the 3DMM process to sensor data 118A to determine a position and/or orientation of the head of the driver at a particular time or over a particular time interval. Further, mobile computing device 130 may generate head pose data, based on such applications. The head pose data may indicate a head pose (e.g., position or orientation) in each of the one or more images of the sensor data, such as sensor data 118A As described herein, a sensor, such as an optical sensor, of sensor unit 117 may be mounted within a vehicle, such as vehicle 109, and the field of view of the optical sensor may include one or more portions of the cabin of the vehicle where the driver is to be seated. In various examples, features or insights that executed head pose engine 112, cloud computing system 120, or mobile computing device 130 may derive from sensor data 118A (e.g., generated by the sensor of sensor unit 117 that is mounted in the cabin of the vehicle) may be inaccurate and lacking. In such examples, driver monitoring computing system 110 may utilize pose data based on sensor data 105A of pose device 101 to increase or improve the accuracy of the head pose determination capabilities (e.g., capabilities of determining a position and/or orientation of the head of the driver) of driver monitoring computing system 110. Additionally, pose device 101 may be a wearable computing device, such as a HMD device, worn by the driver on the head of the user, such as a driver of vehicle 109. Moreover, sensor data 105A may indicate a head pose (e.g., position or orientation) of the head of the user, and the pose data derived from sensor data 105A may identify and characterize one or more head poses or positions and/or orientations of the head of the driver at a particular time or during a particular time interval.

To facilitate the performance of one or more of these exemplary processes, executed head pose engine 112 may perform operations that obtain the pose data associated with pose device 101. As described herein, pose data may be generated and obtained from various sources (e.g., pose device 101, cloud computing system 120, mobile computing device 130, etc.). For instance, in examples where pose device 101 performs operations that deploys a trained localization machine learning process, such as a SLAM process, to sensor data 105A of each of multiple sensors of sensor unit 108A, executed head pose engine 112 may obtain (e.g., receive), from pose device 101, the pose data associated with sensor data 105A. In other instances, cloud computing system 120 performs operations that deploys or executes the trained localization machine learning process to sensor data 105A of each of multiple sensors of sensor unit 108A, and executed head pose engine 112 obtains, from cloud computing system 120, the pose data associated with sensor data 105A. In yet other instances, mobile computing device 130 performs operations that deploys the trained localization machine learning process to sensor data 105A of each of multiple sensors of sensor unit 108A, and executed head pose engine 112 obtains, from mobile computing device 130, the pose data associated with sensor data 105A.

In some examples, executed head pose engine 112 may perform operations that generate pose data based on sensor data 105A of each of multiple sensors of sensor unit 108A. For example, ML database 116 may store a ML dataset 116B associated with a second trained localization machine learning process, such as the SLAM process. In some instances, ML dataset 116 may include one or more model parameters (e.g., hyperparameters) of the second trained localization machine learning process. Additionally, executed head pose engine 112 may obtain or receive, from pose device 101 and over communications network 150, sensor data 105A of each of the multiple sensors of sensor unit 108A. As described herein, sensor data 105A may include at least an image of the environment the driver captured or generated by a sensor, such as an optical sensor of sensor unit 108A, at a particular point in time. Additionally, sensor data 105A may include gyroscope data generated by another sensor, such as a gyroscope sensor, of sensor unit 108A and/or IMU data generated by yet another sensor, such as an IMU, of sensor unit 108A. Both the gyroscope data and the IMU data may be generated or captured by the corresponding sensor at the particular time. Moreover, executed head pose engine 112 may perform operations that deploy and apply the second trained localization machine learning process to sensor data 105A of each of the multiple sensors of sensor unit 108A, in accordance with the ML dataset 116B of the second trained localization machine learning process. Further, executed head pose engine 112 may generate the pose data associated with the sensor data 105A. The pose data may indicate one or more determined positions and/or orientations of the object, such as the head of the driver. As described herein, each of the one or more determined orientations and/or positions of the object may each be associated with a particular image of sensor data 105A captured or generated at a particular point in time and corresponding portions of other sensor data 105A generated or captured at the particular time, such as gyroscope data and/or IMU data.

In some examples, driver monitoring computing system 110 may increase or improve the accuracy of the head pose determination capabilities of driver monitoring computing system 110 by determining whether the obtained pose data based on sensor data 105A is a valid substitute for the head pose data based on sensor data 118A. In such examples, sensor data 105A of the pose data may include one or more elements generated from each of the multiple sensors included in sensor unit 108A, while sensor data 118A of the head pose data may generated from a single sensor, such as an optical sensor, of sensor unit 117. As such the pose data may more accurately indicate a head pose (or position and/or orientation of the head of the driver) than the head pose data generated from sensor data 118A of the sensor of sensor unit 117.

As described herein, the head pose data generated from sensor data 118A may be generated by another computing system, such as cloud computing system 120 or mobile computing device 130. For instance, in examples where cloud computing system 120 perform operations that deploys a trained localization machine learning process, such as a 3DMM process, to sensor data 118A of a sensor, such as an optical sensor, of sensor unit 117, executed head pose engine 112 may obtain (e.g., receive), from cloud computing system 120, the head pose data associated with sensor data 118A. In another instance, in examples where mobile computing device 130 perform operations that deploys a trained localization machine learning process, such as a 3DMM process, to sensor data 118A of a sensor, such as an optical sensor, of sensor unit 117, executed head pose engine 112 may obtain (e.g., receive), from mobile computing device 130, the head pose data associated with sensor data 118A.

In some instances, executed head pose engine 112 may determine whether the pose data is a valid substitute for the head pose data by comparing one or more elements of the pose data to one or more elements of the head pose data. For instance, each of the one or more elements of the head pose data and pose data may identify and characterize a head pose determination of a driver. Additionally, each of the one or more elements may include a timestamp. The timestamp may be associated with the portion of sensor data, such as sensor data 105A or sensor data 118A, that the head pose determination of the corresponding element is based off of. Further, the timestamp may indicate a time and/or date the associate portion of sensor data, such as sensor data 105A or sensor data 118A, was generated or captured by corresponding one or more sensors of sensor unit 108A or sensor unit 117. In some instances, based on one or more elements of head pose data and one or more elements of pose data, executed head pose engine 112 may determine whether a timestamp of each of the one or more elements of pose data and a timestamp of each of the one or more elements of head pose data match. As described herein, executed head pose engine 112 may determine a timestamp of a particular element of pose data and a timestamp of a particular element of head pose data match, if executed head pose engine 112 determines a timestamp of a particular element of pose data and a timestamp of a particular element of head pose data are the exactly the same. In some instances, executed head pose engine 112 may determine a timestamp of a particular element of pose data and a timestamp of a particular element of head pose data match, if executed head pose engine 112 determines a difference between a timestamp of a particular element of pose data and a timestamp of a particular element of head pose data is within a predetermined time threshold or margin.

In instances where executed head pose engine 112 determines the timestamp of each of the one or more elements of pose data and a timestamp of each of the one or more elements of head pose data match, executed head pose engine 112 may determine the pose data may be valid substitute for the head pose data. Based on executed head pose engine 112 determining pose data is valid, driver monitoring computing system 110 may utilize pose data to obtain content for display (e.g., on display unit 108D or a display unit of vehicle 109). Alternatively, in instances where executed head pose engine 112 determines the timestamp of each of the one or more elements of pose data and a timestamp of each of the one or more elements of head pose data do not match or are not within the predetermined time threshold or margin, executed head pose engine 112 may determine pose data is an invalid substitute for the head pose data. Based on executed head pose engine 112 determining pose data is invalid, driver monitoring computing system 110 may utilize head pose data to obtain content for a display (e.g., display unit 108D or a display unit of vehicle 109).

In other instances, executed head pose engine 112 may determine whether the pose data is a valid substitute for the head pose data by determining whether the coordinate system of the head pose determinations of the pose data based on sensor data 105A is the same as the coordinate system of the head pose determinations of the head pose data based on sensor data 118A. For instance, executed head pose engine 112 may determine the coordinate system of the head pose determinations of the pose data is the same as the coordinate system of the head pose determinations of the head pose data. Additionally, executed head pose engine 112 may determine the pose data is a valid substitute for the head pose data upon executed head pose engine 112 determining the coordinate system of the pose data and the coordinate system of the head pose data are the same. Based on executed head pose engine 112 determining pose data is valid, driver monitoring computing system 110 may utilize pose data to obtain content for display (e.g., on display unit 108D or a display unit of vehicle 109). Alternatively, in another instance, executed head pose engine 112 may determine the coordinate system of the head pose determinations of the pose data based on sensor data 105A is the not the same as the coordinate system of the head pose determinations of the head pose data based on sensor data 118A. In response to executed head pose engine 112 determining the coordinate system of the pose data and the coordinate system of the head pose data are not the same, executed head pose engine 112 may determine the pose data is an invalid substitute for the head pose data. Based on executed head pose engine 112 determining pose data is invalid, driver monitoring computing system 110 may utilize head pose data to obtain content for display (e.g., on display unit 108D or a display unit of vehicle 109).

In some examples, each of the one or more elements of the head pose data based on sensor data 118A and pose data based on sensor data 105A may identify and characterize a head pose determination of a driver. Additionally, a coordinate system of the pose data may differ with a coordinate system of the head pose data. For instance, a head pose determination of each of the one or more elements of the pose data may be based to a three-dimensional coordinate system, while a head pose determination of each of the one or more elements of the head pose data may be based on a two-dimensional coordinate system. In such examples, a source (e.g., pose device 101, cloud computing system 120, mobile computing device 130, driver monitoring computing system 110) that generated the pose data may transform the coordinate system associated with the pose data into the coordinate system associated with the head pose data. For instance, the source that generated the pose data may transform the head pose determination of each of one or more elements of the pose data from a three-dimensional coordinate system to a two-dimensional coordinate system.

For instance, pose device 101 may generate the pose data based on sensor data 105A. The pose data may be associated with a three-dimensional coordinate system, while a head pose data may be associated with a two-dimensional coordinate system. Additionally, pose device 101 may obtain from driver monitoring computing system 110 coordinate data that includes data identifying the coordinate system of the head pose data (e.g., the two-dimensional coordinate system). Moreover, pose device 101 may transform the pose data to the dimensional coordinate system of the head pose data based on the coordinate data. In another instance, cloud computing system 120 or mobile computing device 130 may generate the pose data. The cloud computing system 120 or mobile computing device 130 may obtain from driver monitoring computing system 110 the coordinate data as described herein. Additionally, the one or more servers of cloud computing system 120 or one or more processors of mobile computing device 130 may transform the pose data to a coordinate system associated with the head pose data, based on the coordinate data. In yet another instance, driver monitoring computing system 110 may generate the pose data. In such an instance, driver monitoring computing system 110 may perform operations that obtain, from data repository 115 (not shown in FIG. 1), the coordinate data as described herein. Additionally, driver monitoring computing system 110 may, based on the coordinate data, transform the pose data to the coordinate system of the head pose data, after performing the operations that generate the pose data as described herein.

In various instances, executed head pose engine 112 may determine whether the pose data is a valid substitute for the head pose data by comparing sensor data 108A that the pose data is based on to sensor data 118A that the head pose data is based on. As described herein, each element of sensor data 105A may include an image generated or captured by a sensor, such as an optical sensor, of sensor unit 108A. Additionally, each element of sensor data 105A may include a timestamp identifying a time and/or date of when the corresponding image was captured or generated by the sensor of sensor unit 108A. Moreover, each element of sensor data 105A may include portions of other data, such as gyroscope data and/or IMU data, that were generated by other sensor(s), such as gyroscope sensor and/or IMU, of sensor unit 108A, at the same time and/or date of when the corresponding image as captured or generated by the sensor of sensor unit 108A. Further, each element of sensor data 118A may include an image generated or captured by a sensor, such as an optical sensor, of sensor unit 117, along with a timestamp identifying a time and/or date of when the corresponding image was captured or generated by the sensor of sensor unit 117. In such instances, executed head pose engine 112 may, based on one or more elements of sensor data 105A and the sensor data 118A, identify elements of sensor data 105A and elements of sensor data 118A that have matching timestamps. As described herein, executed head pose engine 112 may determine a timestamp of a particular element of sensor data 105A and a timestamp of a particular element of sensor data 118A match, if executed head pose engine 112 determines a timestamp of a particular element of sensor data 105A and a timestamp of a particular element of sensor data 118A are the exactly the same. In some instances, executed head pose engine 112 may determine a timestamp of a particular element of sensor data 105A and a timestamp of a particular element of sensor data 118A match, if executed head pose engine 112 determines a difference between a timestamp of a particular element of sensor data 105A and a timestamp of a particular element of sensor data 118A is within a predetermined time threshold or margin. Based on the elements of sensor data 105A and elements of sensor data 118A with matching timestamps, executed head pose engine 112 may compare one or more portions or regions of interest (ROI) of images of elements of sensor data 118A to one or more portions or ROI of images of elements of sensor data 105A with matching timestamps.

In some examples, executed head pose engine 112 may determine, for each element of the sensor data 118A that has a matching timestamp with an element of sensor data 105A, one or more portions or regions of interest of images of such elements of sensor data 118A that matches one or more portions or regions of interest of images of such elements of sensor data 105A. For instance, executed head pose engine 112 may determine the one or more portions or regions of interest of images of such elements of sensor data 118 and the one or more portions or regions of interest of images of such elements of sensor data 105A each include a cabin of a vehicle, such as vehicle 109. In such examples, executed head pose engine 112 may determine the pose data is a valid substitute for the head pose data. Based on executed head pose engine 112 determining the pose data is valid, driver monitoring computing system 110 may utilize the pose data to obtain content for display (e.g., on display unit 108D or a display unit of vehicle 109). Alternatively, executed head pose engine 112 may determine the one or more portions or regions of interest of an image of an element of sensor data 118 do not match one or more portions or regions of interest of images of such element of sensor data 105A. For instance, executed head pose engine 112 may determine that the one or more portions or regions of interest of images of such elements of sensor data 118 are of the cabin of a vehicle, such as vehicle 109, while the one or more portions or regions of interest of images of such elements of sensor data 105A are of the environment outside of the vehicle. As such, executed head pose engine 112 may determine the pose data is not a valid substitute for head pose data. Based on executed head pose engine 112 determining the pose data is not valid, executed head pose engine 112 may utilize the head pose data to obtain content for display (e.g., on display unit 108D or a display unit of vehicle 109).

In various instances, executed head pose engine 112 may increase or improve the accuracy of the head pose capabilities of driver monitoring computing system 110 by generating a fused head pose dataset including data that more accurately indicates a position and/or orientation of the head of the driver than the head pose data of the sensor, such as an optical sensor, of sensor unit 117. In some examples, executed head pose engine 112 may generate the fused head pose dataset by fusing one or more elements of pose data based on sensor data 105A with one or more elements of head pose data based on sensor data 118A. In such examples, the fused head pose dataset may include one or more elements of pose data and/or one or more elements of head pose data. In some instances, executed head pose engine 112 may apply an extended Kalman filter to the pose data and the head pose data. Further, executed head pose engine 112 may generate the fused head pose dataset based on such applications. In other instances, executed head pose engine 112 may apply a Hungarian matching or other deep learning models to the pose data and the head pose data. Further, executed head pose engine 112 may generate the fused head pose dataset based on such applications.

Moreover, driver monitoring computing system 110 may implement operations that enhance the driver's experience within the cabin of the vehicle based on the head pose data, pose data or fused head pose dataset. For example, driver monitoring computing system 110 may utilize the more accurate pose data or fused head pose dataset to obtain content for a display obtain content for a display (e.g., display unit 108D or a display unit of vehicle 109). If the pose data is determined to be an invalid substitute for the head pose data or if the driver monitoring computing system 110 is unable to fuse the head pose data and the pose data to generate the fused head pose dataset, then driver monitoring computing system 110 may utilize the head pose data to obtain content for the display. To facilitate the performance of one or more of these exemplary operations, application repository 111 of drive monitoring computing system 110 may include content engine 114. Content engine 114 may be executed by the one or more processors of server 110A to obtain head pose data, pose data or the fused head pose dataset. As described herein, executed head pose engine 112 may provide as input to executed content engine 114 pose data based on executed head pose engine 112 determining the pose data is valid. Otherwise, executed head pose engine 112 may provide as input to executed content engine 114 head pose data based on executed head pose engine 112 determining the pose data is invalid. In various instances, executed head pose engine 112 may provide as input to executed content engine 114 the fused head pose dataset that includes one or more elements of pose data and/or one or more elements of head pose data.

In some examples, executed content engine 114 may determine one or more of a series of head poses (positions and/or orientations) of a head of a driver based on the head pose data, pose data, or fused head pose dataset. Examples of a head pose or series of head poses may include, a forward-facing head pose associated with a head looking forward, a left-facing head pose associated with a head looking left, a right-facing head pose associated with a head looking right, and a downward-right-facing head pose associated with a head looking right and downward.

Additionally, executed content engine 114 may obtain a content item, such as a content item indicating or identifying the current speed of a vehicle (e.g., vehicle 109), specific to the determined one or series of head poses. In some instances, executed content engine 114 may communicate with one or more sub systems of a vehicle a corresponding driver is operating, such as vehicle 109. In such instances, each of the one or more sub-systems may be associated with a particular head pose or series of head poses, and executed content engine 114 may communicate with a particular sub system to obtain an associated content item based on the determined head pose or series of head poses. Examples of the one or more sub-systems and associated content items may include navigation sub-systems and associated navigation related content items, speedometer sub-systems and associated speed related content items, tachometer sub-systems and associated rotational speed related content items, fuel sub-systems and associated fuel related content items (e.g., current fuel levels, current average fuel consumption, overall average fuel consumption, etc.), odometer sub-systems and associated travel distance related content items, engine sub-systems and associated engine related content items (e.g., temperature of engine, oil gauge/status, engine status), infotainment sub-systems and associated infotainment related content items (e.g., current media content item being played), external camera subsystems and associated camera feeds from one or more external cameras included in external camera subsystem, safety subsystems and associated safety related content items (e.g., alerts and/or warnings of inattentive driver), etc.

In other instances, data repository 115 may include a content item data store 119 that stores content item data. Each element of content item data may be associated with a specific one or series of head poses, a specific content item, and a specific sub-system that may automatically update the corresponding element. In such instances, executed content engine 114 may obtain, from content item data store 119, specific portions of content item data associated with a particular head pose or series of head poses executed content engine 114 may have determined. In various instances, each element of content item data may be periodically or continuously updated by a corresponding sub-system. In some instances, an element of content item data may be updated, upon executed content engine 114 determining the corresponding head pose or series of head poses from head pose data, pose data or fused head pose dataset.

Further, executed content engine 114 may display a content item specific to the determined one or series of head poses. In some examples, the content item may be presented on display unit 108B of pose device 101. In such examples, executed content engine 114 may communicate with pose device 101 and provide pose device 101 the content item. Pose device 101 may generate and present interface elements associated with the content item. In examples where the content item are one or more images from a live camera feed from an external camera, executed content engine 114 may establish a secure communications channel, over communications network 150, and provide the one or more images of the live camera feed, via the communications channel, to pose device 101. Pose device 101 may present the one or more images of the live camera feed on display unit 108B of pose device 101.

By way of example, executed content engine 114 may obtain head pose data, pose data, or a fused head pose dataset. Additionally, executed content engine 114 may determine a left-facing head pose (e.g., the head of a driver of vehicle 109 is facing left), based on the head pose data, pose data, or fused head pose dataset. Moreover, executed content engine 114 may obtain, either directly from external camera sub-system or from content item data store 119, a content item associated with an external camera of vehicle 109. The external camera may have a field of view that covers the drivers back-left blind spot and the content item may be a live camera feed of the external camera. Further, executed content engine 114, may establish a secure communications channel, over communications network 150, between executed content engine 114 and pose device 101. Executed content engine 114 may provide one or more images from the live camera feed, via the communications channel, over communications network 150 and to pose device 101. Pose device 101 may present the one or more images of the live camera feed on display unit 108B of pose device 101 while the left-facing head pose is maintained (e.g., while the driver is looking left).

In other examples, the content item may be presented on a display unit of a vehicle the driver is operating, such as a center console of vehicle 109. In such examples, executed content engine 114 may generate and present interface elements associated with the content item on the display unit of the vehicle. In examples where the content item is a live camera feed from an external camera, executed content engine 114 may provide one or more images of the live camera feed to the display unit of the vehicle. The display unit of the vehicle may present the one or more images of the live camera feed.

By way of another example, executed content engine 114, may obtain head pose data, pose data, or fused head pose dataset. Additionally, executed content engine 114 may determine a right-facing head pose (e.g., the head of a driver of vehicle 109 is facing right), based on the head pose data, pose data, or fused head pose dataset. Moreover, executed content engine 114 may obtain, either directly from external camera sub-system or from content item data store 119, a content item associated with an external camera of vehicle 109. The external camera may have a field of view that covers the driver's back-right blind spot, and the content item may be a live camera feed of the external camera. Further, executed content engine 114, may provide one or more images from the live camera feed to the display unit of vehicle 109. The display unit of vehicle 109 may present the one or more images of the live camera feed while the right-facing head pose is maintained (e.g., while the head of the driver is facing right).

In various examples, driver monitoring computing system 110 may perform operations that utilize the determined one or more series of head poses (positions and/or orientations) of a head of a driver to enhance the safety of the driver. To facilitate the performance of one or more of these exemplary operations, application repository 111 of drive monitoring computing system 110 may include safety engine 113. Safety engine 113 may be executed by the one or more processors of server 110A to implement a driver monitoring application. For instance, executed safety engine 113 may obtain one or more of head pose data, pose data, or the fused head pose dataset, and may operate on the one or more of head pose data, pose data, or the fused head pose dataset to implement the driver monitoring application. As described herein, executed head pose engine 112 may provide as input to executed safety engine 113 pose data when, for instance, executed head pose engine 112 determines the pose data is valid. Otherwise, executed head pose engine 112 may provide as input to executed safety engine 113 head pose data when the pose data is invalid. In various instances, executed head pose engine 112 may provide as input to executed safety engine 113 the fused head pose dataset that includes one or more elements of pose data and/or one or more elements of head pose data.

In some instances, executed safety engine 113 may determine one or more of a series of head poses (positions and/or orientations) of a head of a driver based on the head pose data, pose data, or fused head pose dataset. Further, executed safety engine 113 may determine whether the determined one or more series of head poses (positions and/or orientations) of the head of the driver indicates fatigue or inattentiveness of the driver. For example, executed safety engine 113 may determine, based on the head pose data, pose data, or fused head pose dataset, the one or more of a series of head poses (positions and/or orientations) of a head of the driver include downward-right-facing head poses (e.g., a head looking right and downward) for longer than a predetermined period of time. Additionally, based on the determined one or more series of head poses, executed safety engine 113 may determine the driver may be fatigued and/or inattentive. In another example, executed safety engine 113 may determine, based on the head pose data, pose data, or fused head pose dataset, that the one or more of a series of head poses (positions and/or orientations) of a head of the driver include upward-right-facing head poses (e.g., a head looking right and upward) for longer than a predetermined period of time. Additionally, based on the determined one or more series of head poses, executed safety engine 113 may determine the driver may be fatigued and/or inattentive.

Additionally, executed safety engine 113 may implement a set of safety operations that provide an alert to a driver operating a vehicle, such as vehicle 109, of the determined potential fatigue state or inattentive state of the driver. In some instances, the set of safety operations may include displaying an alert associated with the determined potential fatigue state or inattentive state of the driver on a display unit of a vehicle the driver is operating (e.g., vehicle 109). For instance, executed safety engine 113 may generate a notification associated with the determined potential fatigue state or inattentive state. Further, executed safety engine 113 may provide the notification to an interface element generation engine of driver monitoring computing system 110. The interface element generation engine may, based on the notification, generate and transmit to a display unit of a vehicle that the driver is operating, such as vehicle 109, one or more graphical elements associated with the notification. The display unit of vehicle 109 may present the one or more graphical elements associated with the notification. The one or more graphical elements may alert the driver of the determined potential fatigue state or inattentive state of the driver. For example, one or more graphical elements may include text associated with the determined potential fatigue state, such as "WARNING FATIGUE DETECTED—Please pull over when it is safe to do so." In another example, one or more graphical elements may include text associated with the determined potential inattentive state, such as "WARNING PLEASE PAY ATTENTION TO THE ROAD."

Additionally, or alternatively, in instances where the vehicle the driver is operating, such as vehicle 109, includes an audio system, the set of safety operations may include executed safety engine 113 causing the audio system to provide an audio output associated with the determined potential fatigue state or inattentive state. For instance, upon executed safety engine 113 determining the potential fatigue state or inattentive state, executed safety engine 113 may generate an instruction that causes the audio system to provide the audio output. The audio output may be an audio recording informing the driver of the detected potential fatigue state or inattentive state (e.g., voice recording or other sound effects).

In instances, where pose device 101 includes a display unit, such as display unit 108B, the set of safety operations may include displaying an alert associated with the determined potential fatigue state or inattentive state of the driver on the display unit of pose device 101. For instance, executed safety engine 113 may generate a notification associated with the determined potential fatigue state or inattentive state. Further, executed safety engine 113 may provide the notification to pose device 101. Pose device 101 may implement operations that generate one or more graphical elements associated with the notification and cause display unit 108B to display the one or more graphical elements. The one or more graphical elements may alert the driver of the determined potential fatigue state or inattentive state of the driver. For example, one or more graphical elements may include text associated with the determined potential fatigue state, such as "WARNING FATIGUE DETECTED—Please pull over when it is safe to do so." In another example, one or more graphical elements may include text associated with the determined potential inattentive state, such as "WARNING PLEASE PAY ATTENTION TO THE ROAD." In yet another example, the graphical elements may be a graphical representation or icon of the alert.

Additionally, or alternatively, in instances where pose device 101 may include a haptic feedback system, such as a haptic unit (not illustrated in FIG. 1), the set of safety operations may include executed safety engine 113 causing the haptic feedback system to provide a vibrational output. For instance, upon executed safety engine 113 determining the potential fatigue state or inattentive state, executed safety engine 113 may generate and transmit an instruction to pose device 101. The instruction may cause pose device 101 to implement operations that cause the haptic feedback system to provide a vibrational output associated with the determined potential fatigue state or inattentive state.

B. Computer-Implemented Techniques for Improving Head Pose Determination Capabilities of the Driver Monitoring System As described herein, driver monitoring computing system 110 may be part of or included in a vehicle, such as vehicle 109. Additionally, driver monitoring computing system 110 may determine and generate head pose data indicating a positioning and/or orientation, such as a head pose, of a head of a driver operating vehicle 109 based on sensor data 118A generated by a sensor of sensor unit 117, such as an optical sensor, of driver monitoring computing system 110. However, as described herein, sensor data 105A of the pose data may include one or more elements generated from each of the multiple sensors included in sensor unit 108A, while sensor data 118A of the head pose data may generated from a single sensor, such as an optical sensor, of sensor unit 117. As such the pose data may more accurately indicate a head pose (or position and/or orientation of the head of the driver) than the head pose data based on sensor data 118A. Further, driver monitoring computing system 110 may increase the accuracy its head pose determinations by utilizing pose data derived from sensor data 105A instead of head pose data based on sensor data 118A. As described herein, pose device 101 may be a wearable computing device, such as a HMD device, that is worn on the head of the driver. Pose device 101 may also generate sensor data 105A of the pose data from each of multiple sensors of sensor unit 108A.

Referring to FIGS. 2A-2D, driver monitoring computing system 110 may include sensor unit 117. Sensor unit 117 may include an optical sensor, such as a monocular camera, configured to generate sensor data, such as sensor data 118A. Sensor data 118A of the optical sensor may include one or more images of an environment the optical sensor is in. Additionally, each of the one or more images may capture a particular scene at a particular point in time, and each scene may include one or more objects of the environment. In some examples, the optical sensor may be mounted within a vehicle, such as vehicle 109, and the field of view of the optical sensor may include one or more portions of the cabin of the vehicle where the driver is to be seated. That way, the one or more images may include the head of the driver. As illustrated in FIG. 2A-2D, driver monitoring computing system 110 may implement operations that generate head pose data 214A based on sensor data 118A. Upon execution by one or more processors of server 110A of driver monitoring computing system 110, executed head pose engine 112 may perform operations that obtain sensor data 118A from an optical sensor of sensor unit 117. Additionally, executed head pose engine 112 may store sensor data 118A within a corresponding portion of data repository 115, such as sensor database 118. Further, executed head pose engine 112 may access data repository 115 and obtain machine learning (ML) dataset 116A of a first trained localization machine learning process 211, such as a 3DMM process. as well as sensor data 118A, either directly from the optical sensor of sensor unit 117 or sensor database 118. As described herein, the first trained localization machine learning process 211 may be configured to determine a position and/or orientation of an object based on sensor data, such as sensor data 118A generated from the optical sensor, such as a monocular camera, of sensor unit 117.

Additionally, executed head pose engine 112 may deploy and apply the first trained localization machine learning process 211 to sensor data 118A in accordance with one or more model parameters of ML dataset 116A. The application of the deployed first trained localization machine learning process 211 to the sensor data 118A may cause executed head pose engine 112 to generate head pose data 214A. Head pose data 214A may indicate a positioning and/or orientation, such as a head pose, of the head the driver. In some instances, executed head pose engine 112 may store head pose data 214A within corresponding portions of data repository 115, such as pose database 215, respectively.

By way of example, sensor data 118A generated by an optical sensor of sensor unit 117 may include one or more images of one or more portions of the cabin of the vehicle, such as vehicle 109, where the driver is to be seated. Further, each of the one or more images may include an image of the head of the driver. Executed head pose engine 112 may obtain sensor data 118A and utilize sensor data 118A as inputs to the first trained localization machine learning process 211, such as a 3DMM process. In some instances, executed head pose engine 112 may detect and determine portions of each of the one or more images of sensor data 118A that have the face of the driver. In such instances, the first trained localization machine learning process 211 may detect a face of the driver in each of the one or more images and plot or fit on the detected face of the driver in each of the one or more images 2D landmarks. Based on the 2D landmarks of each of the one or more images, the first trained localization machine learning process 211 may determine a head pose (e.g., a position and/or orientation) of the head of the driver. Additionally, the first trained localization machine learning process 211 may generate one or more elements of head pose data 214A. In some instances, head pose data 214A may be associated with a two-dimensional coordinate system. In other instances, each of the one or more elements of head pose data 214A may be associated with an image of sensor data 118A and may identify and characterize an associated head pose determined by the first trained localization machine learning process 211.

Figure 2A:
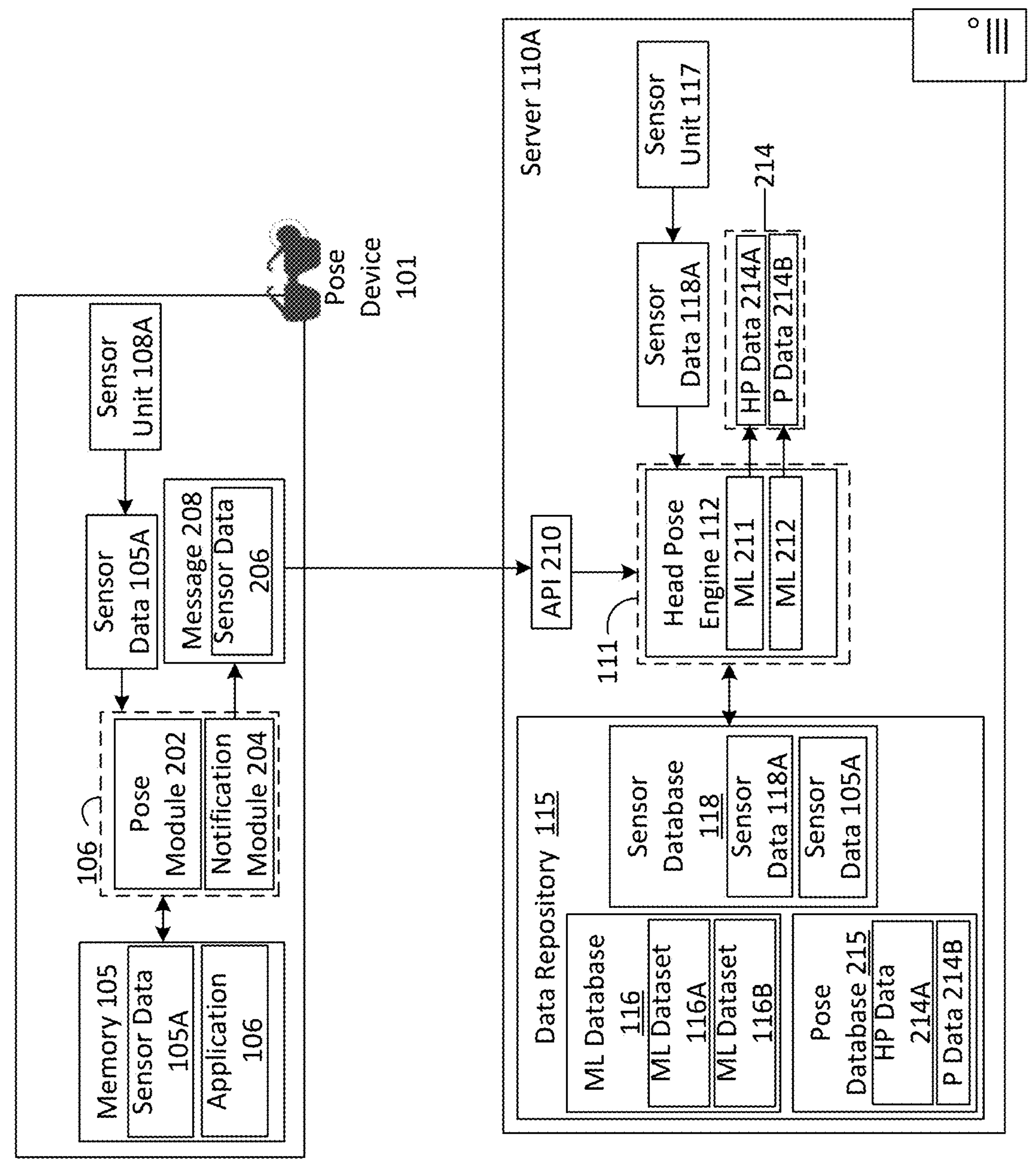
FIGS. 2A, 2B, 2C, and 2D are block diagrams illustrating a portion of an exemplary wireless communication system, in accordance with some exemplary embodiments.

As described herein, the pose data based on sensor data 105A may be generated from various sources, such as pose device 101, cloud computing system 120, mobile computing device 130, or driver monitoring computing system 110, and may indicate a positioning and/or orientation determination, such as a head pose determination, of the head of the driver operating vehicle 109. In some examples, the pose data may be generated by driver monitoring computing system 110. Referring to FIG. 2A, upon execution by processor 107, executed pose module 202 may perform operations that obtain sensor data 105A generated by each of multiple sensors of sensor unit 108A. In some instances, executed pose module 202 may store sensor data 105A into memory 105. As described herein, pose device 101 may be a wearable computing device, such as a HMD device, that is worn on the head of a driver. In some instances, sensor data 105A may include at least an image of the environment of the driver, where the image is captured or generated by a sensor, such as an optical sensor of sensor unit 108A, at a particular point in time. Additionally, sensor data 105A may include gyroscope data generated by another sensor, such as a gyroscope sensor, of sensor unit 108A and/or IMU data generated by yet another sensor, such as an IMU, of sensor unit 108A. Both the gyroscope data and the IMU data may be generated or captured by the corresponding sensor at the particular time. Additionally, upon execution by processor 107, executed notification module 204 may generate message 208 and package one or more portions of sensor data 105A into portions of message 208. Moreover, executed notification module 204 may transmit message 208 to driver monitoring computing system 110 over communications network 150. Application programmatic interface (API) 210 established and maintained by driver monitoring computing system 110 may receive message 208 that includes sensor data 105A. As described herein, driver monitoring computing system 110 may receive message 208 across communications network 150 via a channel of communications established programmatically between API 210 and executed notification module 204.

In some instances, one or more application programs, executed by one or more processors of server 110A of driver monitoring computing system 110, such as head pose engine 112, may perform any of the exemplary processes described herein to generate the pose data 214B from sensor data 105A. Executed head pose engine 112 may parse message 208, obtain sensor data 105A, and store sensor data 105A within a corresponding portion of data repository 115, such as sensor database 118. Additionally, executed head pose engine 112 may perform operations that obtain, from ML database 116, ML dataset 116B of a second trained localization machine learning process 212, such as a SLAM process. As described herein, the second trained localization machine learning process 212 may be configured to determine a position and/or orientation of a head of a user of pose device 101, such as a head of a driver of a vehicle, based on sensor data, such as sensor data 105A, and the ML dataset 116B of second trained localization machine learning process 212. As described herein ML dataset 116B may include one or more model parameters (e.g., hyperparameters) of the corresponding second trained localization machine learning process 212. Additionally, executed head pose engine 112 may obtain sensor data 105A and deploy and apply the second trained localization machine learning process 212 to sensor data 105A in accordance with the one or more model parameters of ML dataset 116B. The application of the deployed second trained localization machine learning process 212 to the sensor data 105A may cause executed head pose engine 112 to generate one or more elements of pose data 214B. As described herein, each of the one or more elements of pose data 214B may indicate a positioning and/or orientation, such as a head pose, of the head the driver. In some instances, each of the one or more elements of pose data 214B may be associated with an image of sensor data 105A generated from an optical sensor of sensor unit 108A. Additionally, each of the one or more elements of pose data 214B may be associated with portions of other sensor data 105A generated or captured at the same time or within a predetermined margin of time of when the image of the corresponding element was generated/captured by the optical sensor of sensor unit 108A. Examples of other sensor data 105A include, among others, gyroscope data, IMU data, and/or accelerometer data. In some instances, executed head pose engine 112 may store pose data 214B within a corresponding portion of data repository 115, such as pose database 215.

Figure 2B:
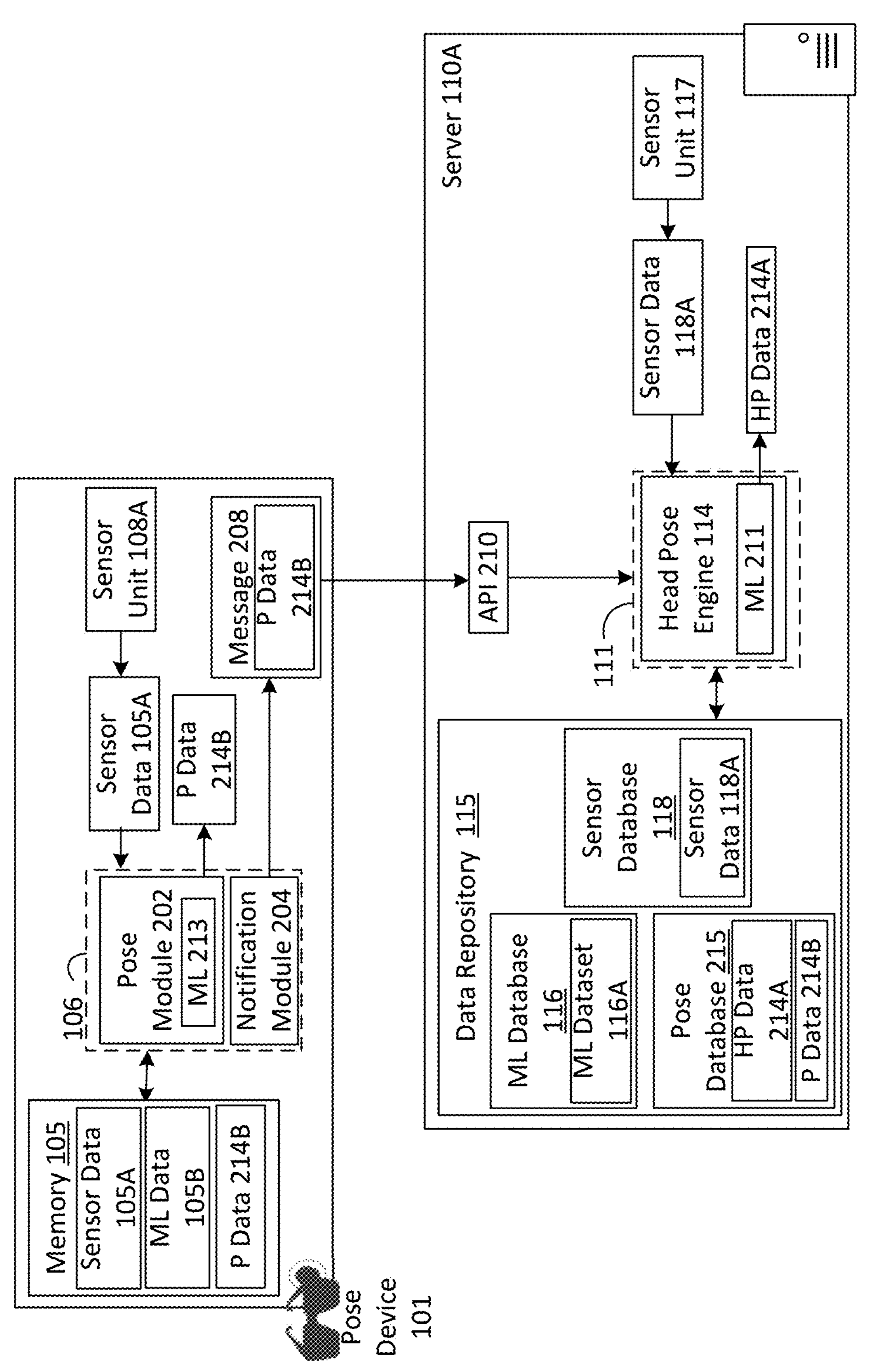

In other examples, pose data may be generated by pose device 101. Referring to FIG. 2B, upon execution by processor 107, executed pose module 202 may perform operations that access memory 105 and obtain ML dataset 105B of a trained localization machine learning process 213, such as a SLAM process. As described herein, processor 107 may apply the trained localization machine learning process to sensor data 105A to determine a position and/or orientation of a head of a user of pose device 101, such as a head of a driver of a vehicle. For example, executed pose module 202 may deploy the trained localization machine learning process and may provide sensor data 105A generated by each of multiple sensors of sensor unit 108A as inputs to the trained localization machine learning process, in accordance with one or more model parameters (e.g., hyperparameters) of ML dataset 105B. The application of the deployed trained localization machine learning process 211 to the sensor data 105A may cause executed pose module 202 to generate pose data 214B. In examples where pose device 101 may be a wearable computing device, such as a HMD device, that is worn on the head of the driver, pose data 214B may indicate a positioning and/or orientation, such as a head pose, of the head the driver. In some instances, executed pose module 202 may store sensor data 105A and pose data 214B into memory 105.

Additionally, executed notification module 204 may generate message 208 and package one or more portions of pose data 214B into portions of message 208. Moreover, executed notification module 204 may transmit message 208 to driver monitoring computing system 110 over communications network 150. API 210 established and maintained by driver monitoring computing system 110 may receive message 208 that includes pose data 214B. As described herein, driver monitoring computing system 110 may receive message 208 across communications network 150 via a channel of communications established programmatically between API 210 and executed notification module 204. Additionally, API 210 may route message 208 to executed head pose engine 112. Executed head pose engine 112 may parse message 208, obtain pose data 214B, and store pose data 214B within a corresponding portion of data repository 115, such as pose database 215.

Figure 2C:
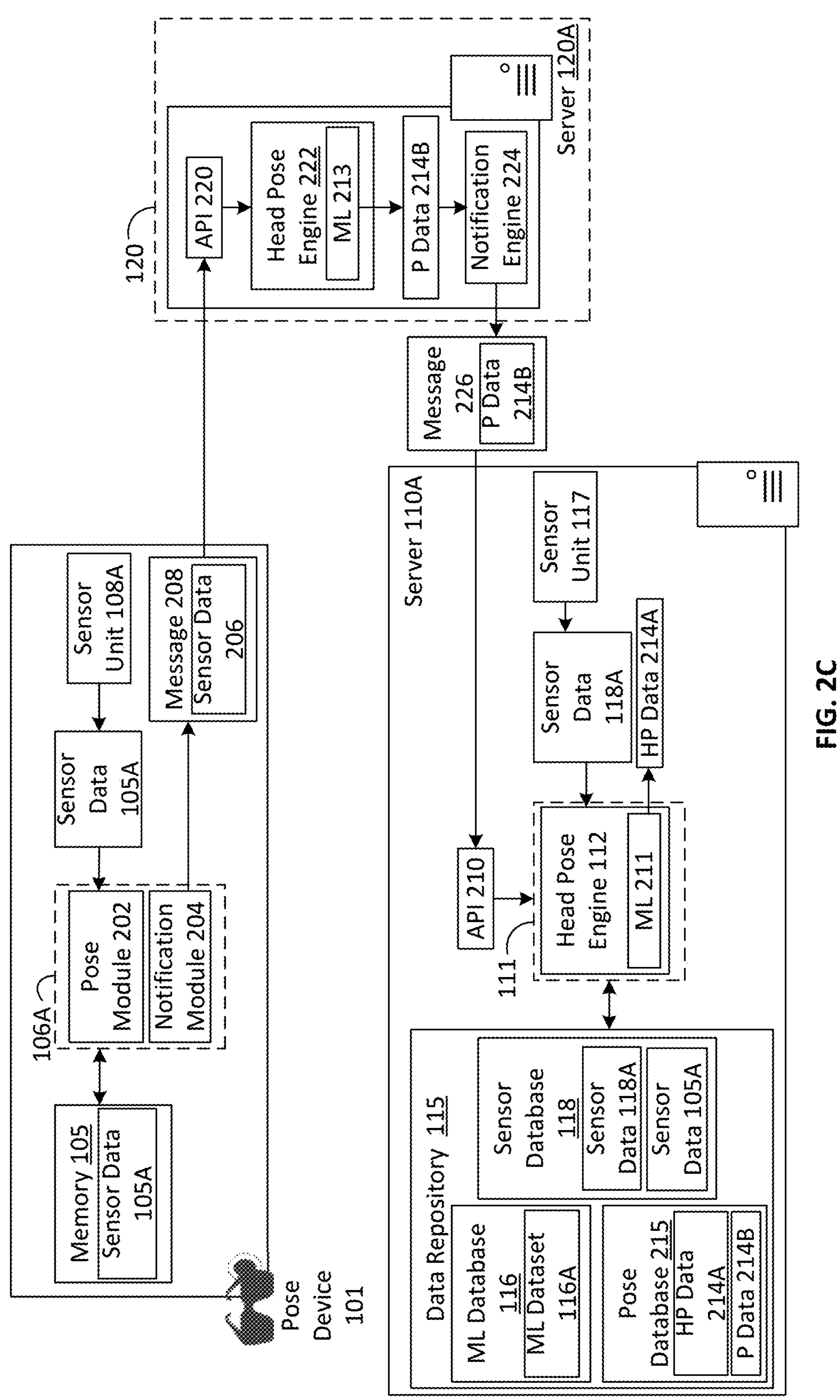

In various examples, pose data may be generated by cloud computing system 120. Referring to FIG. 2C, upon execution by processor 107, executed pose module 202 may perform operations that obtain sensor data 105A generated by each of multiple sensors of sensor unit 108A. In some instances, executed pose module 202 may store sensor data 105A into memory 105. In some examples, pose device 101 may be a wearable computing device, such as a HMD device, that is worn on the head of the driver. As described herein, sensor data 105A may include at least an image of the environment the driver is in and that is captured or generated by a sensor, such as an optical sensor of sensor unit 108A, at a particular point in time. Additionally, sensor data 105A may include gyroscope data generated by another sensor, such as a gyroscope sensor, of sensor unit 108A and/or IMU data generated by yet another sensor, such as an IMU, of sensor unit 108A. Both the gyroscope data and the IMU data may be generated or captured by the corresponding sensor at the particular time. Additionally, upon execution by processor 107, notification module 204 may generate message 208 and package one or more portions of sensor data 105A into portions of message 208. Moreover, executed notification module 204 may transmit message 208 to server 120A of cloud computing system 120 over communications network 150. API 220 established and maintained by server 120A may receive message 208 that includes sensor data 105A. As described herein, server 120A may receive message 208 across communications network 150 via a channel of communications established programmatically between API 220 and executed notification module 204.

Additionally, one or more application programs, executed by one or more processors of server 120A of cloud computing system 120, such as head pose engine 222, may perform any of the exemplary processes described herein, to generate the pose data 214B from sensor data 105A. For instance, executed head pose engine 222 may parse message 208, and obtain sensor data 105A. Additionally, executed head pose engine 222 may perform operations that obtain, from a database of server 120A (not illustrated in FIG. 2C), an ML dataset of a trained localization machine learning process 213, such as a SLAM process. As described herein, the trained localization machine learning process 213 may be configured to determine a position and/or orientation of a head of a user of pose device 101, such as a driver of a vehicle, based on sensor data, such as sensor data 105A, and the ML dataset of trained localization machine learning process 213 may include one or more model parameters (e.g., hyperparameters) of the corresponding trained localization machine learning process 213. Additionally, executed head pose engine 222 may deploy and apply the trained localization machine learning process 213 to sensor data 105A in accordance with one or more model parameters of the ML dataset. The application of the deployed trained localization machine learning process 213 to the sensor data 105A may cause executed head pose engine 222 to generate pose data 214B. In examples where pose device 101 may be a wearable computing device, such as a HMD device, that is worn on the head of the driver, pose data 214B may indicate a positioning and/or orientation, such as a head pose, of the head the driver.

Moreover, one or more processors of server 120A may execute notification module 224. Executed notification module 224 may generate message 226 and package one or more portions of pose data 214B into portions of message 226. Moreover, executed notification module 224 may transmit message 226 to driver monitoring computing system 110 over communications network 150. API 210 established and maintained by driver monitoring computing system 110 may receive message 226 that includes pose data 214B. As described herein, driver monitoring computing system 110 may receive message 226 across communications network 150 via a channel of communications established programmatically between API 210 and executed notification module 224. Additionally, API 210 may route message 226 to executed head pose engine 112. Executed head pose engine 112 may parse message 226, obtain pose data 214B and store pose data 214B within a corresponding portion of data repository 115, such as pose database 215.

Figure 2D:
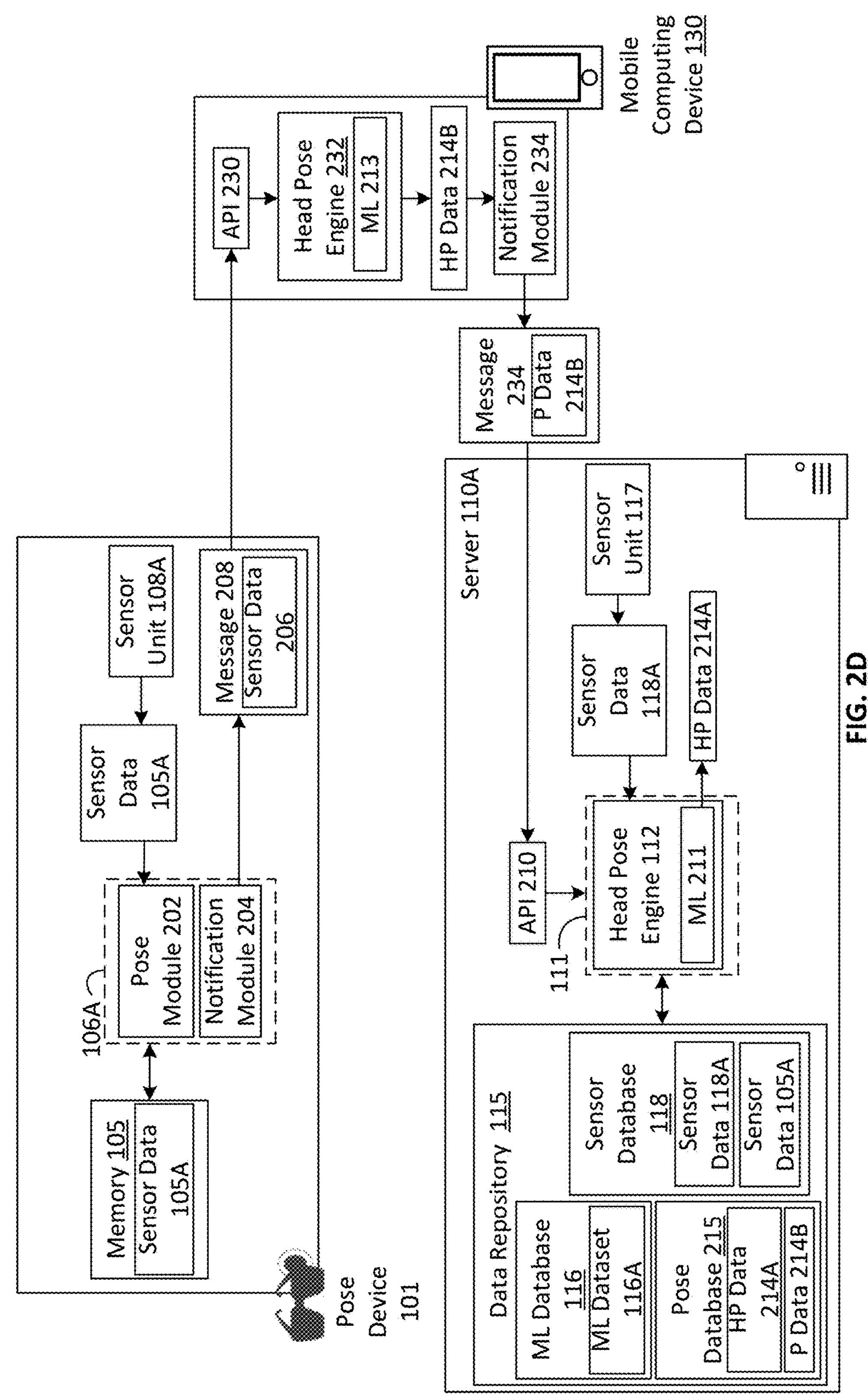

In various examples, pose data may be generated by mobile computing device 130. Referring to FIG. 2D, upon execution by processor 107, executed pose module 202 may perform operations that obtain sensor data 105A generated by each of multiple sensors of sensor unit 108A. In some instances, executed pose module 202 may store sensor data 105A into memory 105. In some examples, pose device 101 may be a wearable computing device, such as a HMD device, that is worn on the head of the driver. Additionally, sensor data 105A may include at least an image of the environment the driver is in where the image is captured or generated by a sensor, such as an optical sensor, of sensor unit 108A at a particular point in time. Additionally, sensor data 105A may include gyroscope data generated by another sensor, such as a gyroscope sensor, of sensor unit 108A and/or IMU data generated by yet another sensor, such as an IMU, of sensor unit 108A. Both the gyroscope data and the IMU data may be generated or captured by the corresponding sensor at the particular time. Moreover, upon execution by processor 107, executed notification module 204 may generate message 208 and package one or more portions of sensor data 105A into portions of message 208. Further, executed notification module 204 may transmit message 208 to mobile computing device 130 over communications network 150. API 230 established and maintained by mobile computing device 130 may receive message 208 that includes sensor data 105A. As described herein, server 120A may receive message 208 across communications network 150 via a channel of communications established programmatically between API 230 and executed notification module 204.

In some instances, one or more application programs, executed by one or more processors of mobile computing device 130, such as head pose engine 232, may perform any of the exemplary processes described herein to generate the pose data 214B from sensor data 105A. Executed head pose engine 232 may parse message 208, and obtain sensor data 105A. Additionally, executed head pose engine 232 may perform operations that obtain, from a database of mobile computing device 130 (not illustrated in FIG. 2D), an ML dataset of a trained localization machine learning process 213, such as a SLAM process. As described herein, the trained localization machine learning process 213 may be configured to determine a position and/or orientation of a head of a user of pose device 101, such as a driver of a vehicle, based on sensor data, such as sensor data 105A, and the ML dataset of trained localization machine learning process 213 may include one or more model parameters (e.g., hyperparameters) of the corresponding trained localization machine learning process 213. Additionally, executed head pose engine 232 may deploy and apply the trained localization machine learning process 213 to sensor data 105A in accordance with the ML dataset. The application of the deployed trained localization machine learning process 213 to the sensor data 105A may cause executed head pose engine 232 to generate one or more elements of pose data 214B.

Additionally, one or more processors of mobile computing device 130 may execute notification module 224. Executed notification module 224 may generate message 236 and package one or more portions of pose data 214B into portions of message 234. Moreover, executed notification module 224 may transmit message 234 to driver monitoring computing system 110 over communications network 150. An API 210 established and maintained by driver monitoring computing system 110 may receive message 234 that includes pose data 214B. As described herein, driver monitoring computing system 110 may receive message 234 across communications network 150 via a channel of communications established programmatically between API 210 and executed notification module 224. Additionally, API 210 may route message 234 to executed head pose engine 112. Executed head pose engine 112 may parse message 234, obtain pose data 214B and store pose data 214B within a corresponding portion of data repository 115, such as pose database 215.

Driver monitoring computing system 110 may implement operations that increases the accuracy of the head pose determination capabilities of driver monitoring computing system 110 by utilizing pose data generated from sensor data 105A of pose device 101, such as pose data 214B. In some examples, driver monitoring computing system 110 may increase the accuracy of the head pose determination capabilities of driver monitoring computing system 110 by determining whether pose data 214B is a valid substitute to head pose data 214A. As described herein, pose data 214B may be based off of sensor data 105A. Additionally, sensor data 105A may be generated by pose device 101, which may be a wearable computing device, such as a HMD device, worn by the driver on the head of the user, such as a driver of vehicle 109. Further, sensor data 105A may include one or more elements generated from each of the multiple sensors included in sensor unit 108A. As such, pose data 214B may more accurately indicate a head pose (or position and/or orientation of the head of the driver) than head pose data 214A generated from sensor data of an optical sensor of sensor unit 117.

Figure 3A:
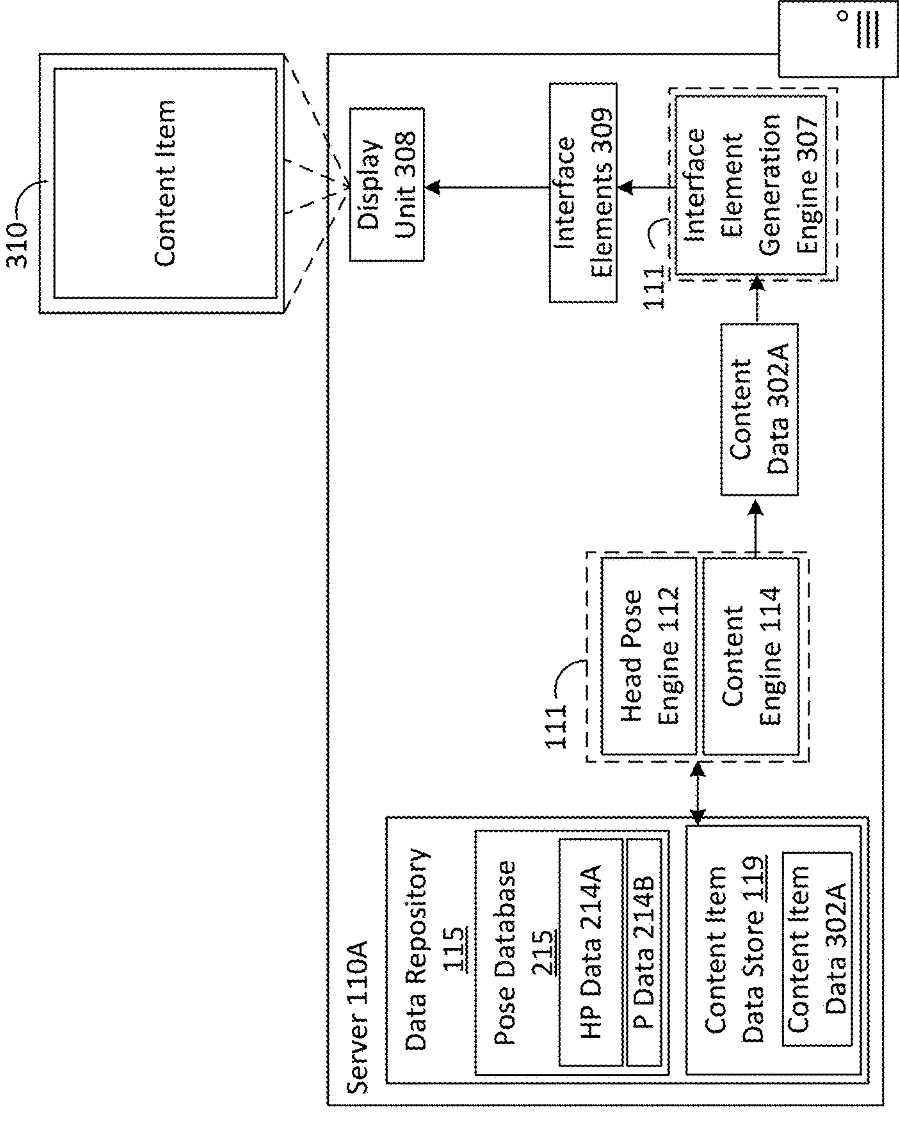
FIGS. 3A, 3B, 3C, and 3D are block diagrams illustrating a portion of an exemplary wireless communication system, in accordance with some exemplary embodiments.

Referring to FIG. 3A, executed head pose engine 112 may perform operations that determine whether pose data 214B is a valid substitute to head pose data 214A. For example, executed head pose engine 112 may perform operations that access pose database 215 and obtain head pose data 214A and pose data 214B. Each of the one or more elements of the head pose data 214A and pose data 214B may identify and characterize a head pose determination of a driver. Additionally, each of the one or more elements may include a timestamp. The timestamp may be associated with the portion of sensor data, such as sensor data 105A or sensor data 118A, that the head pose determination of the corresponding element is based off of. Further, the timestamp may indicate a time and/or date the associate portion of sensor data was generated or captured by corresponding one or more sensors of sensor unit 108A or sensor unit 117. In some instances, based on one or more elements of head pose data 214A and one or more elements of pose data 214B, executed head pose engine 112 may determine whether a timestamp of each of the one or more elements of pose data 214B and a timestamp of each of the one or more elements of head pose data 214A match. As described herein, executed head pose engine 112 may determine a timestamp of a particular element of pose data 214B and a timestamp of a particular element of head pose data 214A match, if executed head pose engine 112 determines a timestamp of a particular element of pose data 214B and a timestamp of a particular element of head pose data 214A are the exactly the same. In some instances, executed head pose engine 112 may determine a timestamp of a particular element of pose data 214B and a timestamp of a particular element of head pose data 214A match, if executed head pose engine 112 determines a difference between a timestamp of a particular element of pose data 214B and a timestamp of a particular element of head pose data 214A within a predetermined time threshold or margin.

In instances where executed head pose engine 112 determines the timestamp of each of the one or more elements of pose data 214B and a timestamp of each of the one or more elements of head pose data 214A match executed head pose engine 112 may determine pose data 214B is a valid substitution for head pose data 214A. Based on executed head pose engine 112 determining pose data 214B is valid, driver monitoring computing system 110 may utilize pose data 214B to obtain content for display (e.g., on display unit 108D or a display unit of vehicle 109). Alternatively, in instances where executed head pose engine 112 determines the timestamp of each of the one or more elements of pose data 214B and a timestamp of each of the one or more elements of head pose data 214A does not match, executed head pose engine 112 may determine pose data 214B is an invalid substitution for head pose data 214A. Based on executed head pose engine 112 determining pose data 214B is invalid, driver monitoring computing system 110 may utilize head pose data 214A to obtain content for display (e.g., on display unit 108D or a display unit of vehicle 109).

In other instances, executed head pose engine 112 may determine whether pose data 214B is a valid substitute for head pose data 214A by determining whether the coordinate system (e.g., two-dimensional coordinate system or three-dimensional coordinate system) of the head pose determinations of pose data 214B is the same as the coordinate system of the head pose determinations of head pose data 214A. For instance, executed head pose engine 112 may obtain head pose data 214A and pose data 214B. Additionally, executed head pose engine 12 may, based on one or more elements of head pose data 214A and one or more elements of pose data 214B, determine the coordinate system of the head pose determinations of pose data 214B is the same as the coordinate system of the head pose determinations of head pose data 214A. Additionally, executed head pose engine 112 may determine pose data 214B is a valid substitute for head pose data 214A upon executed head pose engine 112 determining the coordinate system of the head pose determinations of pose data 214B and the coordinate system of the head pose determinations of head pose data 214A are the same. Based on executed head pose engine 112 determining pose data 214B is valid, driver monitoring computing system 110 may utilize pose data 214B to obtain content for display (e.g., on display unit 108D or a display unit of vehicle 109). Alternatively, in another instance, executed head pose engine 112 may, based on one or more elements of head pose data 214A and one or more elements of pose data 214B, determine the coordinate system of the head pose determinations of pose data 214B is the not the same as the coordinate system of the head pose determinations of head pose data 214A. In response to executed head pose engine 112 determining the coordinate system of the head pose determinations of pose data 214B and the coordinate system of the head pose determinations of head pose data 214A are not the same, executed head pose engine 112 may determine pose data 214B is an invalid substitute for the head pose data. Based on executed head pose engine 112 determining pose data 214B is invalid, driver monitoring computing system 110 may utilize head pose data 214A to obtain content for display (e.g., on display unit 108D or a display unit of vehicle 109).

In some examples, each of the one or more elements of head pose data 214A and pose data 214B may identify and characterize a head pose determination of a driver. Additionally, a coordinate system of a head pose determination of each of the one or more elements of pose data 214B may differ with a coordinate system of a head pose determination of each of the one or more elements of head pose data 214A. For instance, a head pose determination of each of the one or more elements of pose data 214B may be based on a three-dimensional coordinate system, while a head pose determination of each of the one or more elements of head pose data 214A may be based on a two-dimensional coordinate system. In such examples, a source (e.g., pose device 101, cloud computing system 120, mobile computing device 130, driver monitoring computing system 110) that generated pose data 214A may transform the coordinate system associated with pose data 214B into the coordinate system associated with head pose data 214A. For instance, the source that generated pose data 214B may transform the head pose determination of each of one or more elements of pose data 214B from a three-dimensional coordinate system to a two-dimensional coordinate system.

For instance, pose device 101 may generate pose data 214B based on sensor data 105A. Pose data 214B may be associated with a three-dimensional coordinate system, while head pose data 214A may be associated with a two-dimensional coordinate system. Additionally, pose device 101 may obtain from driver monitoring computing system 110 coordinate data that includes data identifying the coordinate system of the head pose data (e.g., the two-dimensional coordinate system). Moreover, pose device 101 may transform pose data 214B to the dimensional coordinate system of head pose data 214A based on coordinate data. In another instance, cloud computing system 120 or mobile computing device 130 may generate the pose data. The cloud computing system 120 or mobile computing device 130 may obtain from driver monitoring computing system 110 the coordinate data as described herein. Additionally, the one or more servers of cloud computing system 120 or one or more processors of mobile computing device 130 may transform pose data 214B to a coordinate system associated with head pose data 214A, based on the coordinate data. In yet another instance, driver monitoring computing system 110 may generate pose data 214A. Additionally, driver monitoring computing system 110 may transform pose data 214B to the coordinate system of head pose data 214A, based on the coordinate data as described herein that may be stored in driver monitoring computing system 110.

In various instances, executed head pose engine 112 may determine whether pose data 214B is a valid substitute for the head pose data 214A by comparing sensor data 108A that pose data 214A is based on to sensor data 118A that head pose data 214B is based on. As described herein, each element of sensor data 105A may include an image generated or captured by a sensor, such as an optical sensor, of sensor unit 108A. Additionally, each element of sensor data 105A may include a timestamp identifying a time and/or date of when the corresponding image was captured or generated by the sensor of sensor unit 108A. Moreover, each element of sensor data 105A may include portions of other data, such as gyroscope data and/or IMU data, that were generated by other sensor(s), such as gyroscope sensor and/or IMU, of sensor unit 108A, at the same time and/or date of when the corresponding image as captured or generated by the sensor of sensor unit 108A. Further, each element of sensor data 118A may include an image generated or captured by a sensor, such as an optical sensor, of sensor unit 117, along with a timestamp identifying a time and/or date of when the corresponding image was captured or generated by the sensor of sensor unit 117. In such instances, based on one or more elements of sensor data 105A and the sensor data 118A, executed head pose engine 112 may identify one or more elements of sensor data 105A and one or more elements of sensor data 118A that have matching timestamps. As described herein, executed head pose engine 112 may determine a timestamp of a particular element of sensor data 105A and a timestamp of a particular element of sensor data 118A match, if executed head pose engine 112 determines a timestamp of a particular element of sensor data 105A and a timestamp of a particular element of sensor data 118A are the exactly the same. In some instances, executed head pose engine 112 may determine a timestamp of a particular element of sensor data 105A and a timestamp of a particular element of sensor data 118A match, if executed head pose engine 112 determines a difference between a timestamp of a particular element of sensor data 105A and a timestamp of a particular element of sensor data 118A is within a predetermined time threshold or margin. Based on the elements of sensor data 105A and elements of sensor data 118A with matching timestamps, executed head pose engine 112 may compare one or more portions or regions of interest (ROI) of images of elements of sensor data 118A to one or more portions or ROI of images of elements of sensor data 105A with matching timestamps.

In some examples, executed head pose engine 112 may determine, for each element of the ROI that has a matching timestamp with an element of sensor data 105A, one or more portions or ROI of images of such elements of sensor data 118A that matches one or more portions or ROIs of images of such element of sensor data 105A. For instance, executed head pose engine 112 may determine that the one or more portions or regions of interest of images of such elements of sensor data 118 and the one or more portions or regions of interest of images of such element of sensor data 105A include the same portions of the cabin of a vehicle, such as vehicle 109. Based on the determined match, executed head pose engine 112 may determine the pose data 214B is a valid substitute for head pose data 214A. Based on executed head pose engine 112 determining the pose data 214B is valid, driver monitoring computing system 110 may obtain content for display (e.g., on display unit 108D or a display unit of vehicle 109).

In other examples, executed head pose engine 112 may determine that one or more portions or regions of interest of an image of an element of sensor data 118A do not match one or more portions or regions of interest of images of such element of sensor data 105A. For instance, executed head pose engine 112 may determine the one or more portions or regions of interest of images of such elements of sensor data 118 are of the cabin of a vehicle, such as vehicle 109, while the one or more portions or regions of interest of images of such elements of sensor data 105A are of the environment outside of the vehicle. In such instances, executed head pose engine 112 may determine the pose data 214B is not a valid substitution for head pose data 214A. Based on executed head pose engine 112 determining pose data 214B is not valid, driver monitoring computing system 110 may utilize head pose data 214A to obtain content for display (e.g., on display unit 108D or a display unit of vehicle 109).

In various examples, executed head pose engine 112 may increase the accuracy of head pose determinations of head pose data 214A by generating a fused head pose dataset. As described herein, the fused head pose dataset may include data that the more accurately indicates a position and/or orientation of the head of the driver than the head pose data 214A. For example, executed head pose engine 112 may perform operations that access pose database 215 and obtain head pose data 214A and pose data 214B. Additionally, executed head pose engine 112 may fuse (e.g., combine) one or more elements of pose data 214B with one or more elements of head pose data 214A. In such an example, the fused head pose dataset may include one or more elements of pose data 214B and/or one or more elements of head pose data 214A. For example, executed head pose engine 112 may apply an extended Kalman filter to pose data 214B and the head pose data 214A to generate the fused head pose dataset. In other examples, executed head pose engine 112 may apply a Hungarian matching or other deep learning models to the pose data 214B and the head pose data 214A to generate the fused head pose dataset. In some instances, driver monitoring computing system 110 may utilize the fused head pose dataset to obtain content for display (e.g., on display unit 108D or a display unit of vehicle 109).

Referring back to FIG. 3A, driver monitoring computing system 110 may perform operations that utilize head pose data 214A, pose data 214B, or fused head pose dataset to obtain and select content items. Additionally, driver monitoring computing system 110 may present the selected content items on display unit 308 of driver monitoring computing system 110. As described herein, display unit 308 may be a display unit of a vehicle, such as a center console of vehicle 109 or a heads up display (HUD) of vehicle 109.

For example, one or more processors of server 110A of driver monitoring computing system 110 may execute content engine 114. Executed content engine 114 may obtain head pose data 214A, pose data 214B, or fused head pose dataset. As described herein, executed head pose engine 112 may provide as input to executed content engine 114 pose data 214B upon executed head pose engine 112 determining pose data 214B is valid. Otherwise, executed head pose engine 112 may provide as input to executed content engine 114 head pose data 214A, such as when executed head pose engine 112 determines pose data 214B is invalid. In various instances, executed head pose engine 112 may generate a fused head pose dataset based on one or more elements of pose data 214B and/or one or more elements of head pose data 214A, and may provide as input to executed content engine 114 the fused head pose dataset.

Referring back to FIG. 3A, executed content engine 114, may determine one or a series of head poses (positions and/or orientations) of a head of a driver based on head pose data 214A, pose data 214B, or the fused head pose dataset. Moreover, executed content engine 114 may perform operations that access data repository 115 (e.g., as maintained within the one or more tangible, non-transitory memories of driver monitoring computing system 110) and obtain, from content item data store 119, a portion of content item data 302A stored in content item data store 119 corresponding to a content item specific to the determined one or series of head poses. As described herein, one or more elements of content item data 302A may be associated with a specific one or series of head poses, a specific content item, and a specific sub-system that may automatically update the corresponding element. In some instances, executed content engine 114 may communicate with one or more sub systems of vehicle 109. In such instances, each of the one or more sub-systems may be associated with a particular head pose or series of head poses and executed content engine 114 may communicate with a particular sub system to obtain an associated content item based on the determined head pose or series of head poses.

Further, one or more processors of server 110A of driver monitoring computing system 110 may execute interface element generation engine 307. Executed interface element generation engine 307 may obtain from executed content engine 114 the obtained portion of content item data 302A corresponding to the content item specific to the determined one or series of head poses. Additionally, executed interface element generation engine 307 may perform operations that generate interface elements 309 associated with the portion of content item data 302A corresponding to the content item specific to the determined one or series of head poses. Further, executed interface element generation engine 307 may perform operations that route interface elements 309 to display unit 308.

In some instances, when rendered for presentation within a corresponding notification interface 310 by display unit 308, interface elements 309 may provide a graphical representation of the corresponding content item the user, such as the driver of vehicle 109, within a single display screen or window, or across multiple display screens or windows, of notification interface 310 (e.g., in accordance with the one or more elements of layout data that specifies a disposition of, or a visual characteristic of, one or more interface elements that establish a graphical representation of the portion of content item data 302A when presented on a digital interface, such as notification interface 310 by an application program executed by driver monitoring computing system 110).

By way of example, executed content engine 114, may obtain head pose data 214A, pose data 214B, or a fused head pose dataset from data repository 115. Additionally, executed content engine 114 may determine a forward-facing head pose (e.g., the head of a driver of vehicle 109 is facing forward), based on the head pose data 214A, pose data 214B or fused head pose dataset. Moreover, executed content engine 114 may obtain, either directly from a corresponding sub-system, such as navigation sub-system, speedometer sub-system, tachometer sub-system, fuel sub-system, odometer sub-system and/or engine sub-system, or from content item database 302, a portion of content item data 302A corresponding to a content item associated with the forward-facing head pose, such as content items related to navigation, speed measurements of vehicle 109, rotational speed measurements of vehicle 109, fuel related measurements of vehicle 109, distance measurements of vehicle 109 and/or engine related measurements of vehicle 109, respectively. Further, executed content engine 114, may provide the portion of content item data 302A corresponding to the content item associated with the forward-facing head pose to executed interface element generation engine 307. Executed interface element generation engine 307 may generate interface elements 309 associated with the portion of content item data 302A corresponding to the content item associated with the forward-facing head pose. Further, executed interface element generation engine 307 may perform operations that route interface elements 309 to display unit 308. As described herein, the display unit 308 may be a heads up display (HUD) that projects the interface elements 309 on a windshield of vehicle 109.

Figure 3B:
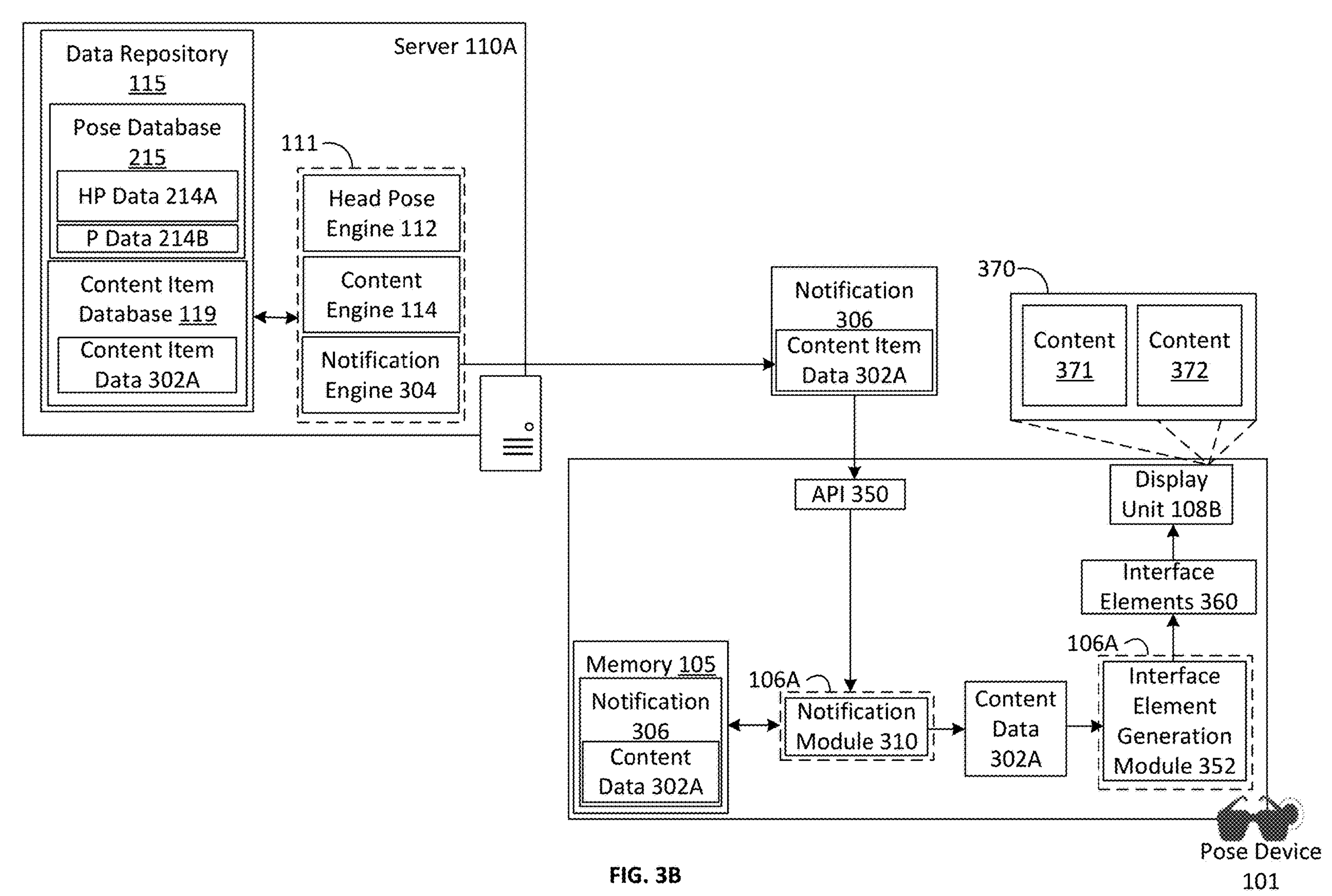

In some examples, driver monitoring computing system 110 may perform operations that cause pose device 101 to present content items associated with one or a series of head poses determined from head pose data 214A, pose data 214B or fused head pose dataset. Referring to FIG. 3B, executed content engine 114 may obtain head pose data 214A, pose data 214B, or a fused head pose dataset. Additionally, executed content engine 114, may determine one or a series of head poses (positions and/or orientations) of a head of a driver based on head pose data 214A, pose data 214B, or the fused head pose dataset. Moreover, executed content engine 114 may perform operations that obtain, either from content item database 302 or directly from a corresponding sub-system of vehicle 109, a content item or corresponding portion of content item data 302A specific to the determined one or series of head poses. Further, one or more processors of server 110A of driver monitoring computing system 110 may execute notification engine 304. Executed notification engine 304 may generate notification 306 and package one or more portions of content item data 302A corresponding to the content item of the determined one or series of head poses into portions of notification 306. In various instances, executed notification engine 304 may transmit, over communications network 150 and to pose device 101, notification 306 that includes one or more portions of content item data 302A corresponding to the content item of the determined one or series of head poses. Further, API 350, established and maintained by pose device 101, may receive notification 306. As described herein, pose device 101 may receive notification 306 across communications network 150 via a channel of communications established programmatically between API 350 and executed notification engine 304.

API 350 may route notification 306 to executed notification module 224. Executed notification module 310 may parse notification 306 and obtain the one or more portions of content item data 302A corresponding to the content item of the determined one or series of head poses. Additionally, processor 107 may execute interface element generation module 352 and executed notification module 224 may provide the one or more portions of content item data 302A as input into executed interface element generation module 352. Executed interface element generation module 352 may perform operations that generate interface elements 360 associated with the one or more portions of content item data 302A corresponding to the content item specific to the determined one or series of head poses. Further, executed interface element generation module 352 may perform operations that routes interface elements 309 to display unit 108B.

In some instances, when rendered for presentation within a corresponding interface 370 by display unit 108B, interface elements 360 may provide a graphical representation of the corresponding content item the user, such as the driver of vehicle 109, within a single display screen or window, or across multiple display screens or windows, of interface 370 (e.g., in accordance with the one or more elements of layout data that specifies a disposition of, or a visual characteristic of, one or more interface elements that establish a graphical representation of the portion of content item data 302A when presented on a digital interface, such as notification interface 370 by an application program executed by pose device 101).

By way of example, executed content engine 114, may obtain head pose data 214A, pose data 214B, or fused head pose dataset, and may determine a forward-facing head pose (e.g., the head of a driver of vehicle 109 is facing forward), based on the head pose data 214A, pose data 214B, or fused head pose dataset. Moreover, executed content engine 114 may obtain, either directly from a corresponding sub-system, such as navigation sub-system, speedometer sub-system, tachometer sub-system, fuel sub-system, odometer sub-system and/or engine sub-system, or from content item database 302, a portion of content item data 302A corresponding to a content item associated with the forward-facing head pose, such as content items related to navigation, speed measurements of vehicle 109, rotational speed measurements of vehicle 109, fuel related measurements of vehicle 109, distance measurements of vehicle 109 and/or engine related measurements of vehicle 109, respectively. Further, executed content engine 114, may provide the content item associated with the forward-facing head pose to executed notification engine 304. Executed notification engine 304 may generate notification 306 that includes the portion of content item data 302A corresponding to a content item associated with the forward-facing head pose. Additionally, executed notification engine 304 may transmit notification 306 to pose device 101. API 350 of pose device 101 may receive notification 306 and route notification 306 to executed notification module 224. Executed notification module 224 may parse and obtain the portion of content item data 302A corresponding to the content item associated with the forward-facing head pose. Moreover, executed notification module 224 may provide the portion of content item data 302A corresponding to the content item associated with the forward-facing head pose as input to executed interface element generation module 352. Executed interface element generation module 352 may generate interface elements 360 associated with the portion of content item data 302A corresponding to the content item associated with the forward-facing head pose. Further, executed interface element generation engine 307 may perform operations that route interface elements 360 to display unit 108B for display to the driver of vehicle 109. As described herein, pose device 101 may be a wearable computing device, such as a HMD device, that is worn on the head of the driver. As such, interface elements 360 may be presented on a display unit 108B of the HMD device.

Figure 3C:
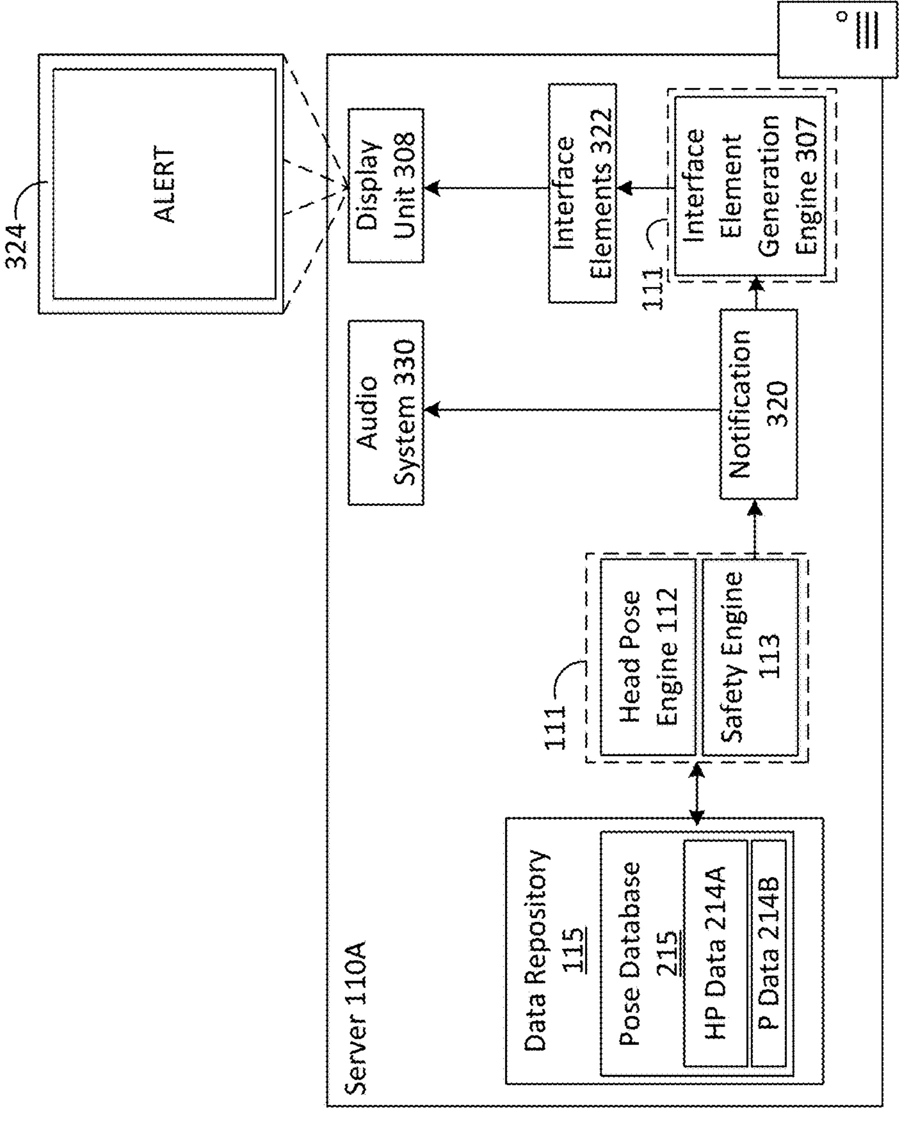
Figure 3D:
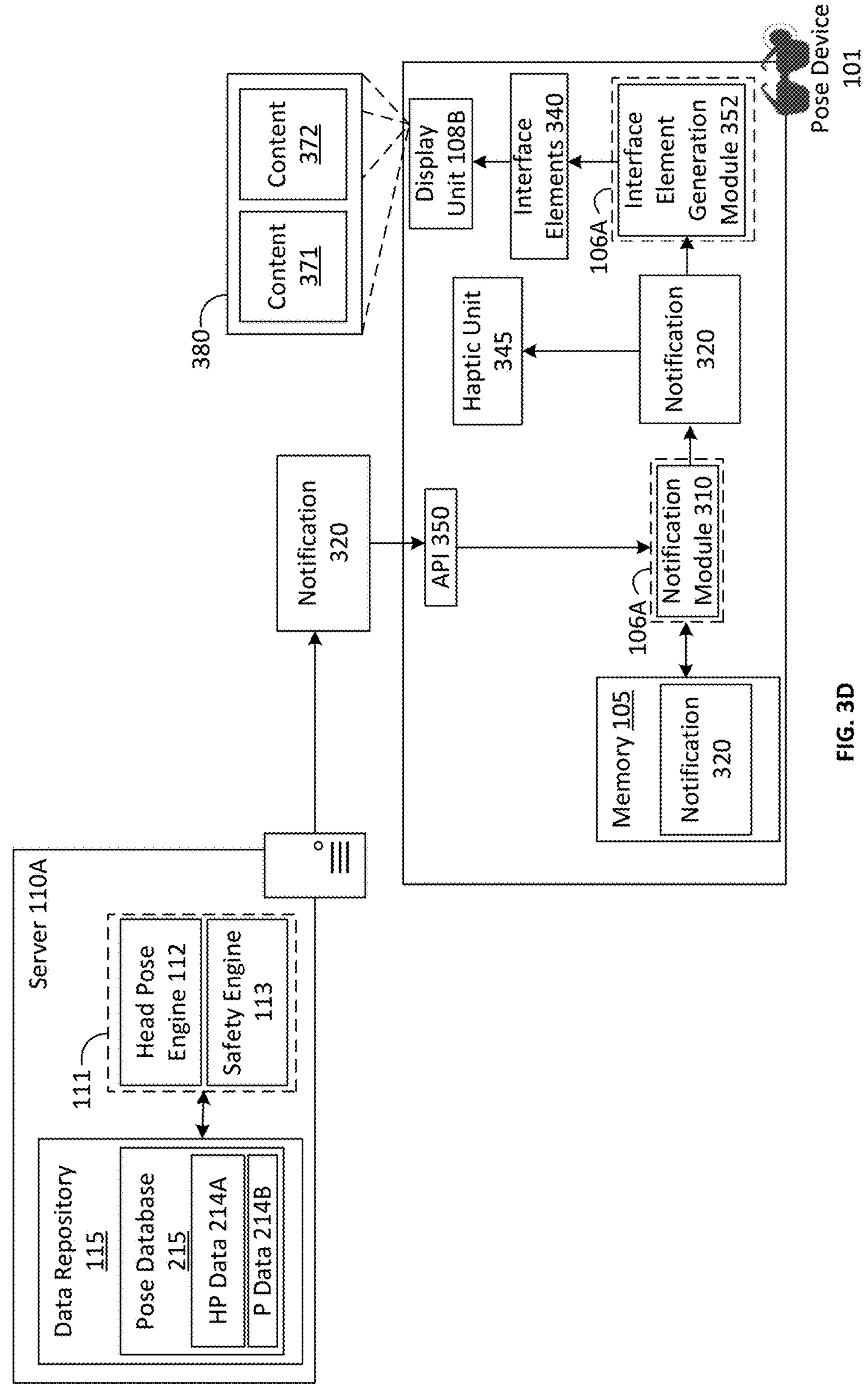

In various examples, driving monitoring computing system 110 may perform operations that utilize head pose data 214A, pose data 214B, or fused head pose dataset to enhance the safety of a driver of a vehicle, such as vehicle 109. Referring to FIG. 3C (and similarly in FIG. 3D), to facilitate the performance of one or more of these exemplary operations, one or more processors of server 110A of driver monitoring computing system 110, may execute safety engine 113 to obtain head pose data 214A, pose data 214B, or fused head pose dataset. As described herein, executed head pose engine 112 may provide as input to execute safety engine 113 pose data 214B upon executed head pose engine 112 determining pose data 214B is valid. Otherwise, executed head pose engine 112 may provide as input to execute safety engine 113 head pose data 214A, such as when executed head pose engine 112 determines pose data 214B is invalid. In various instances, executed head pose engine 112 may generate a fused head pose dataset based on one or more elements of pose data 214B and/or one or more elements of head pose data 214A, and may provide as input to execute safety engine 113 the fused head pose dataset.

Additionally, execute safety engine 113 may determine one or more of a series of head poses (positions and/or orientations) of a head of a driver based on head pose data 214A, pose data 214B, or fused head pose dataset. Further, executed safety engine 113 may determine whether the determined one or more series of head poses (positions and/or orientations) of the head of the driver indicates fatigue or inattentiveness of the driver. In various instances, executed safety engine 113 may generate notification 320 that identifies and characterizes whether the determined one or more series of head poses (positions and/or orientations) of the head of the driver indicates fatigue or inattentiveness of the driver.

For example, executed safety engine 113 may determine the one or more of a series of head poses (positions and/or orientations) of a head of the driver is downward-right-facing head pose (e.g., a head looking right and downward) for longer than a predetermined period of time, based on the head pose data, pose data, or fused head pose dataset. Additionally, based on the determined one or more series of head poses, executed safety engine 113 may determine the driver may be fatigued and/or inattentive. Further, executed safety engine 113 may generate notification 320 that indicates the driver may be fatigued and/or inattentive.

Referring back to FIG. 3C, executed safety engine 113 may provide as input to interface element generation engine 307, notification 320. Executed interface element generation engine 307 may perform operations that utilize notification 320 to generate interface elements 322 associated with an alert for the determined potential fatigue or inattentiveness of the driver. Further, executed interface element generation engine 307 may perform operations that route interface elements 322 to display unit 308. Display unit 308 may present interface elements 322. In some examples, when displayed on display unit 308, the interface elements 322 may include text associated with the determined potential fatigue state, such as "WARNING FATIGUE DETECTED—Please pull over when it is safe to do so. In other examples, the interface elements 322 may include text associated with the determined potential inattentive state, such as "WARNING PLEASE PAY ATTENTION TO THE ROAD.

In some instances, when rendered for presentation within a corresponding notification interface 324 by display unit 308, interface elements 322 may provide a graphical representation of the alert associated with the determined potential fatigue or inattentiveness of the driver, such as the driver of vehicle 109, within a single display screen or window, or across multiple display screens or windows, of notification interface 324 (e.g., in accordance with the one or more elements of layout data that specifies a disposition of, or a visual characteristic of, one or more interface elements that establish a graphical representation of the alert when presented on a digital interface, such as notification interface 324 by an application program executed by driver monitoring computing system 110).

Additionally, or alternatively, in instances where the vehicle the driver is operating, such as vehicle 109, includes audio system 330, the set of safety operations may include executed safety engine 113 causing audio system 330 to provide an audio output associated with the determine potential fatigue state or inattentive state. For instance, upon executed safety engine 113 determining the potential fatigue state or inattentive state, executed safety engine 113 may generate notification 320 that indicates the driver may be fatigued and/or inattentive. Further, executed safety engine 113 may route notification 320 to audio system 330. Audio system 330 may, based on notification 320, output an audio output associated with notification 320, such as an audio recording informing the driver of the detected potential fatigue state or inattentive state (e.g., voice recording or other sound effects). For instance, audio system 330 may include one or more speakers. Additionally, the speakers may output the audio output into a cabin of vehicle 109 an audio recording informing the driver of the detected potential fatigue state or inattentive state (e.g., voice recording or other sound effects).

In some examples, driver monitoring computing system 110 may cause pose device 101 to perform operations enhance the safety of a driver of a vehicle, such as vehicle 109. For example, and with reference to FIG. 3D, upon executed safety engine 113 determining the potential fatigue state or inattentive state (based on head pose data 214A, pose data 214B, or fused head pose dataset), executed safety engine 113 may generate notification 320 that indicates the determine potential fatigue state or inattentiveness state of the driver. Additionally, executed safety engine 113 may transmit, over communications network 150 and to pose device 101, notification 320. Further, API 350, established and maintained by pose device 101, may receive notification 320. As described herein, pose device 101 may receive notification 320 across communications network 150 via a channel of communications established programmatically between API 350 and executed safety engine 313.

API 350 may route notification 320 to executed notification module 224. In some examples, executed notification module 310 may store notification 320 within memory 105. Additionally, executed notification module 310 may provide notification 320 as input into executed interface element generation module 352. Executed interface element generation module 352 may, based on notification 320, perform operations that generate interface elements 340 associated with an alert for the determined potential fatigue or inattentiveness of the driver. Further, executed interface element generation module 352 may perform operations that routes interface elements 340 to display unit 108B. Display unit 108B may present interface elements 340. In some examples, when displayed on display unit 108B, the interface elements 340 may include text associated with the determined potential fatigue state, such as "WARNING FATIGUE DETECTED. In other examples, the interface elements 340 may include text associated with the determined potential inattentive state, such as "WARNING PLEASE PAY ATTENTION TO THE ROAD. In yet another example, the interface elements 340 may be a graphical representation or icon of the alert.

In some instances, when rendered for presentation within a corresponding interface 380 by display unit 108B, interface elements 340 may provide a graphical representation of the alert, within a single display screen or window, or across multiple display screens or windows, of interface 380 (e.g., in accordance with the one or more elements of layout data that specifies a disposition of, or a visual characteristic of, one or more interface elements that establish a graphical representation of the alert when presented on a digital interface, such as notification interface 380 by an application program executed by pose device 101).

Additionally, or alternatively, in instances where pose device 101 includes a haptic feedback system, such as a haptic unit 345, the set of safety operations may include executed safety engine 113 causing the haptic feedback system to provide a vibrational output. For instance, upon executed safety engine 113 determining the potential fatigue state or inattentive state as described herein, executed safety engine 113 may generate and transmit notification 320 that indicates the driver may be fatigued and/or inattentive to pose device 101. API 350 may receive and route notification 320 to executed notification module 224. Additionally, executed notification module 310 may provide notification 320 as input into haptic unit 345. In response to receiving notification 320, haptic unit 345 may output a vibrational.

FIG. 4 is a flowchart of an exemplary process 400 for fusing head pose data, such as head pose data 214A and pose data 214B. For example, one or more computing systems, such as driver monitoring computing system 110, may perform one or more steps of exemplary process 400, as described below in reference to FIG. 4. Referring to FIG. 4, driver monitoring computing system 110 may perform any of the processes described herein to obtain a first dataset indicating a first head pose estimation of a head of a user in each of a first set of images generated by pose device 101 (e.g., in step 402 of FIG. 4). In some examples, the first dataset may be pose data 214B. Additionally, the first dataset or pose data 214B may be based on sensor data 105A of a set of sensors of sensor unit 108A of pose device 101. As described herein, pose device 101 may be a wearable computing device, such as a HMD device, that is worn on the head of the driver.

Additionally, driver monitoring computing system 110 may perform any of the processes described herein to obtain a second dataset indicating a second head pose estimation of a head of the user in each of a second set of images generated by a sensor of an apparatus, such as a vehicle, such as vehicle 109, driver monitoring computing system 110 is included in or associated with (e.g., in step 404 of FIG. 4). In some examples, the second dataset may be head pose data 214A. Additionally, the second dataset or head pose data 214A may be based on sensor data 118A of a sensor, such as an optical sensor, of sensor unit 117 of driver monitoring computing system 110. In other examples, executed head pose engine 112 may perform operations that access pose database 215 and obtain second dataset or head pose data 214A and first dataset or pose data 214B.

Moreover, driver monitoring computing system 110 may perform any of the processes described herein to generate a fused dataset based on the first dataset and the second dataset (e.g., in step 406 of FIG. 4). As described herein, the fused dataset or fused head pose dataset may include data that the more accurately indicates a position and/or orientation of the head of the driver than the second dataset or head pose data 214A. Additionally, executed head pose engine 112 may fuse (e.g., combine) one or more elements of the first dataset or pose data 214B with one or more elements of the second dataset or head pose data 214A. Moreover, the fused dataset, may include one or more elements of pose data 214B and/or one or more elements of head pose data 214A. In some examples, executed head pose engine 112 may apply an extended Kalman filter to pose data 214B and the head pose data 214A. Further, executed head pose engine 112 may generate the fused dataset based on such applications.

Further, driver monitoring computing system 110 may perform any of the processes described herein to determine a third head pose estimation of the head of the user based on the fused dataset (e.g., in step 408 of FIG. 4), and in response to determining the third head pose estimation of the head of the user, driver monitoring computing system 110 may determine content for display (e.g., in step 410 of FIG. 4). As described herein, executed content engine 114 may obtain the fused dataset, and may determine the third head pose estimation(s), such as one or a series of head poses (positions and/or orientations) of a head of a driver, based on the fused dataset. Moreover, executed content engine 114 may perform operations that obtain, either from content item database 302 or directly from a corresponding sub-system of vehicle 109, a content item (e.g., a corresponding portion of content item data 302A) specific to the determined third head pose estimation(s).

In some examples, driver monitoring computing system 110 may present the determined or obtained content or content item on a display. As described herein, in some instances, driver monitoring computing system 110 may perform operations that cause a display of a vehicle, such as display unit 308 of vehicle 109, to present content or content items associated with the determined third head pose estimation. In other instances, driver monitoring computing system 110 may perform operations that cause pose device 101 to present content or content items associated with the determined third head pose estimation.

Figure 5:
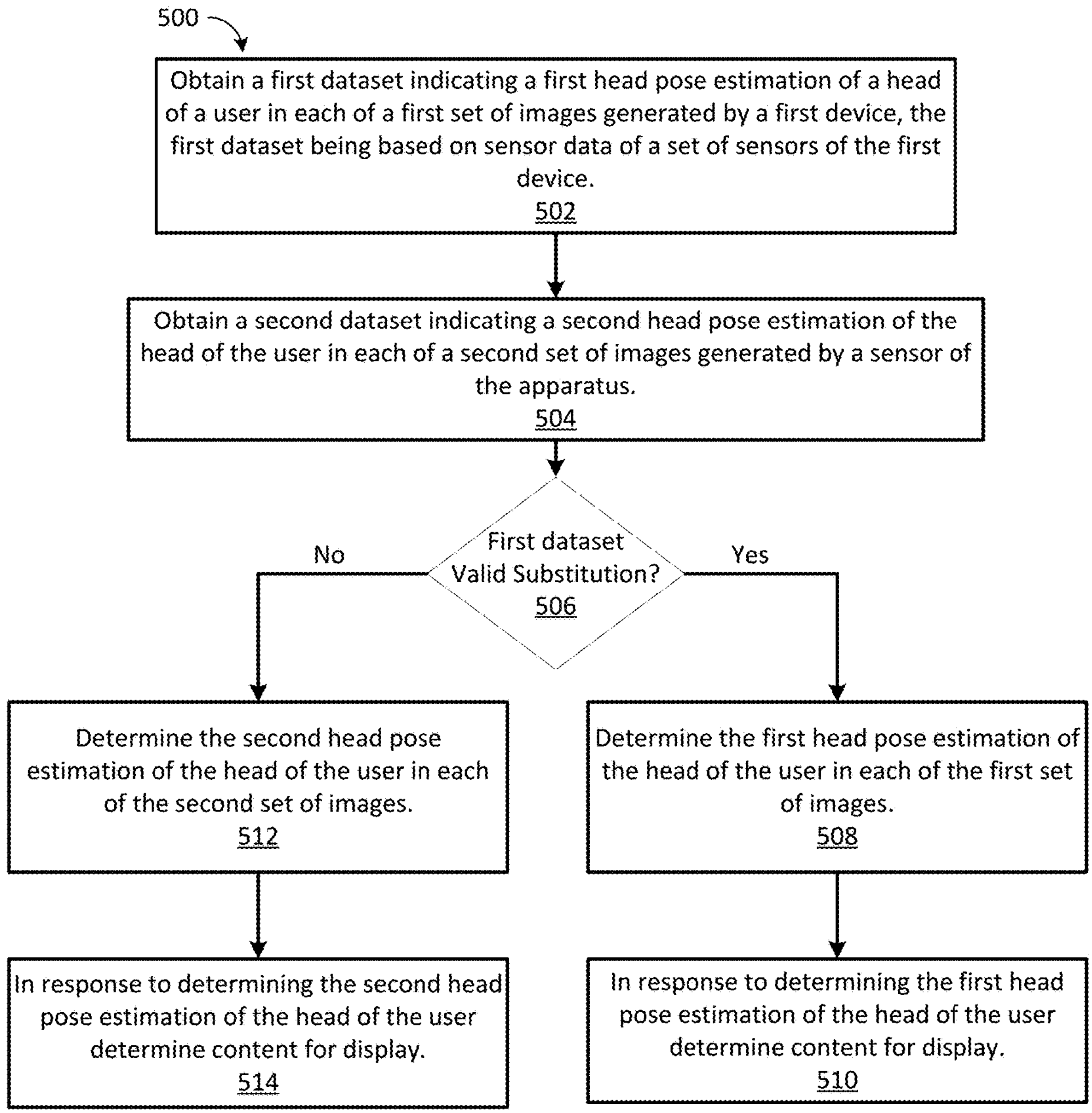
FIG. 5 is a flowchart of an exemplary process 500 for determining whether the pose data is valid, in accordance with some exemplary embodiments.

FIG. 5 is a flowchart of an exemplary process 500 for determining whether the pose data, such as pose data 214B, is a valid substitution for head pose data 214A. For example, one or more computing systems, such as driver monitoring computing system 110, may perform one or more steps of exemplary process 500, as described below in reference to FIG. 5. Referring to FIG. 5, driver monitoring computing system 110 may perform any of the processes described herein to obtain a first dataset indicating a first head pose estimation of a head of a user in each of a first set of images generated by pose device 101 (e.g., in step 502 of FIG. 5). In some examples, the first dataset may be pose data 214B. As described herein, the first dataset or pose data 214B may be based on sensor data 105A of a set of sensors of sensor unit 108A of pose device 101. In some instances, pose device 101 may be a wearable computing device, such as a HMD device, that is worn on the head of the driver.

Additionally, driver monitoring computing system 110 may perform any of the processes described herein to obtain a second dataset indicating a second head pose estimation of a head of the user in each of a second set of images generated by a sensor of an apparatus, such as a vehicle, such as vehicle 109, driver monitoring computing system 110 is included in or associated with (e.g., in step 504 of FIG. 5). As described herein, the second dataset may be head pose data 214A. Additionally, the second dataset or head pose data 214A may be based on sensor data 118A of a sensor, such as an optical sensor, of sensor unit 117 of driver monitoring computing system 110. In some instances, executed head pose engine 112 may perform operations that access pose database 215 and obtain second dataset or head pose data 214A and first dataset or pose data 214B.

Moreover, driver monitoring computing system 110 may perform any of the processes described herein to determine whether the first dataset is a valid substitute for the second dataset (e.g., in step 506 of FIG. 5). As described herein, in some instances, executed head pose engine 112 may compare a timestamp of each of one or more elements of the first dataset or pose data 214B with a timestamp of each of one or more elements of second dataset or head pose data 214A to determine whether first dataset is a valid substitution for the second dataset. In other instances, executed head pose engine 112 may compare a coordinate system of a first dataset or pose data 214B to a coordinate system of a second dataset or head pose data 214A to determine whether the first dataset is a valid substitution for the second dataset. In various instances, executed head pose engine 112 may compare sensor data 108A that the first dataset or pose data 214A is based on to sensor data 118A that the second dataset or head pose data 214B is based on to determine whether the first dataset is a valid substitution for the second dataset.

In examples where driver monitoring computing system determines the first dataset is a valid substitute for the second dataset, driver monitoring computing system 110 may perform any of the processes described herein to determine the first head pose estimation of the head of the user in each of the first set of images (e.g., in step 508 of FIG. 5), and in response to determining the first head pose estimation(s) of the head of the user, driver monitoring computing system 110 may perform any of the processes described herein to determine content for display (e.g., in step 510 of FIG. 5). As described herein, executed content engine 114 may obtain the first dataset or pose data 214B. Additionally, executed content engine 114 may determine the first head pose estimation(s), such as one or a series of head poses (positions and/or orientations) of a head of a driver, based on the first dataset or pose data 214B. Moreover, executed content engine 114 may perform operations that obtain, either from content item database 302 or directly from a corresponding sub-system of vehicle 109, a content item or corresponding portion of content item data 302A specific to the determined the first head pose estimation(s).

In some examples, driver monitoring computing system 110 may present the determined or obtained content or content item on a display. As described herein, in some instances, driver monitoring computing system 110 may perform operations that cause a display of a vehicle, such as display unit 308 of vehicle 109, to present content or content items associated with the determined first head pose estimation(s). In other instances, driver monitoring computing system 110 may perform operations that cause pose device 101 to present content or content items associated with the determined first head pose estimation(s).

In examples where driver monitoring computing system determines the first dataset is an invalid substitute for the second dataset, driver monitoring computing system 110 may perform any of the processes described herein to determine the second head pose estimation of the head of the user in each of the second set of images (e.g., in step 512 of FIG. 5), and in response to determining the second head pose estimation of the head of the user, driver monitoring computing system 110 may perform any of the processes described herein to determine content for display (e.g., in step 514 of FIG. 5). As described herein, executed content engine 114 may obtain the second dataset or head pose data 214A. Additionally, executed content engine 114 may determine the first head pose estimation, such as one or a series of head poses (positions and/or orientations) of a head of a driver, based on the second dataset or head pose data 214A. Moreover, executed content engine 114 may perform operations that obtain, either from content item database 302 or directly from a corresponding sub-system of vehicle 109, a content item or corresponding portion of content item data 302A specific to the determined the second head pose estimation(s).

In some examples, driver monitoring computing system 110 may present the determined or obtained content or content item on a display. As described herein, in some instances, driver monitoring computing system 110 may perform operations that cause a display of a vehicle, such as display unit 308 of vehicle 109, to present content or content items associated with the determined second head pose estimation(s). In other instances, driver monitoring computing system 110 may perform operations that cause pose device 101 to present content or content items associated with the determined second head pose estimation (s).

Implementation examples are further described in the following numbered clauses:

1. An apparatus comprising:
   a non-transitory, machine-readable storage medium storing instructions; and
   at least one processor coupled to the non-transitory, machine-readable storage medium, the at least one processor being configured to execute the instructions to:
      obtain a first dataset indicating a first head pose estimation of a head of a user in each of a first set of images generated by a first device, the first dataset being based on sensor data of a set of sensors of the first device;
      obtain a second dataset indicating a second head pose estimation of the head of the user in each of a set of images generated by a first sensor of the apparatus;
      generate a fused dataset based on the first dataset and the second dataset;
      determine a third head pose estimation of the head of the user based on the fused dataset; and
      output the third head pose estimation.
2. The apparatus of clause 1, wherein the first dataset is generated based on an application of a first trained machine learning process to the sensor data of the set of sensors of the first device.
3. The apparatus of clause 2, wherein the first trained machine learning process is a simultaneous location and mapping (SLAM) algorithm.
4. The apparatus of any of clauses 1-3, wherein the first device is a head mounted display (HMD) device including the set of sensors, and wherein the at least one processor is further configured to:
   obtain, over one or more networks and from the first device, the first dataset.
5. The apparatus of any of clauses 1-3, wherein the at least one processor is further configured to:
   obtain, over one or more networks and from the first device, the sensor data of the set of sensors of the first device;
   apply a first trained machine learning process to the sensor data of the set of sensors; and
   generate the first dataset based on the application of the first trained machine learning process to the sensor data.
6. The apparatus of any of clauses 1-3, wherein the first device is a HMD device including the set of sensors, and wherein the at least one processor is further configured to:

receive, over one or more networks and from a cloud computing system, the first dataset.

7. The apparatus of clause 6, wherein the first dataset is generated based on an application of a first trained machine learning process to the sensor data of the set of sensors.
8. The apparatus of any of clauses 1-7, wherein the second dataset is generated based on an application of a second trained machine learning process to the set of images generated by the first sensor of the apparatus.
9. The apparatus of clause 8, wherein the second trained machine learning process is a three-dimensional morphable model (3DMM).
10. The apparatus of any of clauses 1-9, wherein the set of sensors includes at least one of an optical sensor, a gyroscopic sensor and an inertial measurement unit.
11. The apparatus of any of clauses 1-10, wherein the first sensor is an optical sensor.
12. The apparatus of any of clauses 1-11, wherein generating the fused dataset includes applying an extended Kalman filter (EKF) to the first dataset and the second dataset.
13. The apparatus of any of clauses 1-12, wherein outputting the third head pose estimation comprises:
    providing the third head pose estimation to a driver monitoring application.
14. The apparatus of any of clauses 1-13, wherein outputting the third head pose estimation comprises determining content for a display in response to the determination of the third head pose estimation of the head of the user.
15. The apparatus of any of clauses 14, wherein determining content for the display includes determining content of a subsystem of the apparatus that is associated with the third head pose estimation of the head of the user and presenting the determined content on the display.
16. The apparatus of clause 15, wherein the first device includes the display, and wherein presenting the determined content on the display includes communicating with the first device to cause the first device to present the determined content on the display of the first device.
17. The apparatus of clause 15, wherein the apparatus further comprises the display, and wherein presenting the determined content on the display includes communicating with the first device to cause the first device to present the determined content on the display of the first device.
18. The apparatus of clause 17, wherein the display is a heads up display (HUD).
19. A non-transitory, machine-readable storage medium storing instructions that, when executed by at least one processor of a server, causes the at least one processor to perform operations that include:
    obtaining a first dataset indicating a first head pose estimation of a head of a user in each of a first set of images generated by a first device, the first dataset being based on sensor data of a set of sensors of the first device;
    obtaining a second dataset indicating a second head pose estimation of the head of the user in each of a set of images generated by a first sensor of an apparatus;
    generating a fused dataset based on the first dataset and the second dataset;
    determining a third head pose estimation of the head of the user based on the fused dataset; and
    outputting the third head pose estimation.
20. The non-transitory, machine-readable storage medium of clause 19, wherein the first dataset is generated based on an application of a first trained machine learning process to the sensor data of the set of sensors of the first device.
21. The non-transitory, machine-readable storage medium of clause 20, wherein the first trained machine learning process is a simultaneous location and mapping (SLAM) algorithm.
22. The non-transitory, machine-readable storage medium of any of clauses 19-21, wherein the first device is a head mounted display (HMD) device including the set of sensors, and wherein the at least one processor is further configured to:
    obtain, over one or more networks and from the first device, the first dataset.
23. The non-transitory, machine-readable storage medium of any of clauses 19-21, wherein the at least one processor is further configured to:
    obtain, over one or more networks and from the first device, the sensor data of the set of sensors of the first device;
    apply a first trained machine learning process to the sensor data of the set of sensors; and
    generate the first dataset based on the application of the first trained machine learning process to the sensor data.
24. The non-transitory, machine-readable storage medium of any of clauses 19-21, wherein the first device is a HMD device including the set of sensors, and wherein the at least one processor is further configured to:
    receive, over one or more networks and from a cloud computing system, the first dataset.
25. The non-transitory, machine-readable storage medium of clause 24, wherein the first dataset is generated based on an application of a first trained machine learning process to the sensor data of the set of sensors.
26. The non-transitory, machine-readable storage medium of any of clauses 19-25, wherein the second dataset is generated based on an application of a second trained machine learning process to the set of images generated by the first sensor of the apparatus.
27. The non-transitory, machine-readable storage medium of clause 26, wherein the second trained machine learning process is a three-dimensional morphable model (3DMM).
28. The non-transitory, machine-readable storage medium of any of clauses 19-27, wherein the set of sensors includes at least one of an optical sensor, a gyroscopic sensor and an inertial measurement unit.
29. The non-transitory, machine-readable storage medium of any of clauses 19-28, wherein the first sensor is an optical sensor.
30. The non-transitory, machine-readable storage medium of any of clauses 19-29, wherein generating the fused dataset includes applying an extended Kalman filter (EKF) to the first dataset and the second dataset.
31. The non-transitory, machine-readable storage medium of any of clauses 19-30, wherein outputting the third head pose estimation comprises:
    providing the third head pose estimation to a driver monitoring application.
32. The non-transitory, machine-readable storage medium of any of clauses 19-31, wherein outputting the third head pose estimation comprises determining content for a display in response to the determination of the third head pose estimation of the head of the user.

33. The non-transitory, machine-readable storage medium of clause 32, wherein determining content for the display includes determining content of a subsystem of the apparatus that is associated with the third head pose estimation of the head of the user and presenting the determined content on the display.

34. The non-transitory, machine-readable storage medium of clause 33, wherein the first device includes the display, and wherein presenting the determined content on the display includes communicating with the first device to cause the first device to present the determined content on the display of the first device.

35. The non-transitory, machine-readable storage medium of clause 33, wherein the apparatus further comprises the display, and wherein presenting the determined content on the display includes communicating with the first device to cause the first device to present the determined content on the display of the first device.

36. The non-transitory, machine-readable storage medium of clause 35, wherein the display is a heads up display (HUD).

37. A computer-implemented method performed by an application program executed on at least one processor of a vehicle, the computer-implemented method comprising:

obtaining, by the application program executed on the at least one processor, a first dataset indicating a first head pose estimation of a head of a user in each of a first set of images generated by a first device, the first dataset being based on sensor data of a set of sensors of the first device;

obtaining, by the application program executed on the at least one processor, a second dataset indicating a second head pose estimation of the head of the user in each of a set of images generated by a first sensor of a second device;

generating, by the application program executed on the at least one processor, a fused dataset based on the first dataset and the second dataset;

determining, by the application program executed on the at least one processor, a third head pose estimation of the head of the user based on the fused dataset; and outputting the third head pose estimation.

38. The computer-implemented method of clause 37, wherein the first dataset is generated based on an application of a first trained machine learning process to the sensor data of the set of sensors of the first device.

39. The computer-implemented method of clause 38, wherein the first trained machine learning process is a simultaneous location and mapping (SLAM) algorithm.

40. The computer-implemented method of any of clauses 37-39, wherein the first device is a HMD device including the set of sensors, and wherein the method further comprises:

obtaining, over one or more networks and from the first device, the first dataset.

41. The computer-implemented method of any of clauses 37-39, wherein the method further comprises:

obtaining, over one or more networks and from the first device, the sensor data of the set of sensors of the first device;

applying a first trained machine learning process to the sensor data of the set of sensors; and generating the first dataset based on the application of the first trained machine learning process to the sensor data.

42. The computer-implemented method of any of clauses 37-39, wherein the first device is a HMD device including the set of sensors, and wherein the method further comprises:

obtaining, over one or more networks and from a cloud computing system, the first dataset.

43. The computer-implemented method of clause 42, wherein the first dataset is generated based on the application of a first trained machine learning process to the sensor data of the set of sensors.

44. The computer-implemented method of any of clauses 37-43, wherein the second dataset is generated based on an application of a second trained machine learning process to the set of images generated by the first sensor of the second device.

45. The computer-implemented method of clause 44, wherein the second trained machine learning process is a three-dimensional morphable model (3DMM).

46. The computer-implemented method of any of clauses 37-45, wherein the set of sensors includes at least one of an optical sensor, a gyroscopic sensor and an inertial measurement unit.

47. The computer-implemented method of any of clauses 37-46, wherein the first sensor is an optical sensor.

48. The computer-implemented method of any of clauses 37-47, wherein generating the fused dataset includes applying an extended Kalman filter (EKF) to the first dataset and the second dataset.

49. The computer-implemented method of any of clauses 37-48, wherein outputting the third head pose estimation comprises:

providing the third head pose estimation to a driver monitoring application.

50. The computer-implemented method of any of clauses 37-49, wherein the method further comprises:

determining, by the application program executed on the at least one processor, content for a display in response to determining the third head pose estimation of the head of the user.

51. The computer-implemented method of clause 50, wherein determining content for the display includes determining content of a subsystem of the second device that is associated with the third head pose estimation of the head of the user and presenting the determined content on the display.

52. The computer-implemented method of clause 51, wherein the first device includes the display, and wherein presenting the determined content on the display includes communicating with the first device to cause the first device to present the determined content on the display of the first device.

53. The computer-implemented method of clause 51, wherein the second device further comprises the display, and wherein presenting the determined content on the display includes communicating with the first device to cause the first device to present the determined content on the display of the first device.

54. The computer-implemented method of clause 53, wherein the display is a heads up display (HUD).

55. A driver monitoring computing device comprising:

a means for obtaining, by the application program executed on the at least one processor, a first dataset indicating a first head pose estimation of a head of a user in each of a first set of images generated by a first device, the first dataset being based on sensor data of a set of sensors of the first device;

a means for obtaining, by the application program executed on the at least one processor, a second dataset indicating a second head pose estimation of the head of the user in each of a set of images generated by a first sensor of the driver monitoring computing device;

a means for generating, by the application program executed on the at least one processor, a fused dataset based on the first dataset and the second dataset;

a means for determining, by the application program executed on the at least one processor, a third head pose estimation of the head of the user based on the fused dataset; and a means for outputting the third head pose estimation.

56. The driver monitoring computing device of clause 55, wherein the first dataset is generated based on an application of a first trained machine learning process to the sensor data of the set of sensors of the first device.

57. The driver monitoring computing device of clause 56, wherein the first trained machine learning process is a simultaneous location and mapping (SLAM) algorithm.

58. The driver monitoring computing device of any of clauses 55-57, wherein the first device is a HMD device including the set of sensors, and wherein the driver monitoring computing device further comprises:

a means for obtaining, over one or more networks and from the first device, the first dataset.

59. The driver monitoring computing device of any of clauses 55-57, wherein the driver monitoring computing device further comprises:

a means for obtaining, over one or more networks and from the first device, the sensor data of the set of sensors of the first device;

a means for applying a first trained machine learning process to the sensor data of the set of sensors; and a means for generating the first dataset based on the application of the first trained machine learning process to the sensor data.

60. The driver monitoring computing device of any of clauses 55-57, wherein the first device is a HMD device including the set of sensors, and wherein the driver monitoring computing device comprises:

a means for obtaining, over one or more networks and from a cloud computing system, the first dataset.

61. The driver monitoring computing device of clause 60, wherein the first dataset is generated based on the application of a first trained machine learning process to the sensor data of the set of sensors.

62. The driver monitoring computing device of any of clauses 55-61, wherein the second dataset is generated based on an application of a second trained machine learning process to the set of images generated by the first sensor of the driver monitoring computing device.

63. The driver monitoring computing device of clause 62, wherein the second trained machine learning process is a three-dimensional morphable model (3DMM).

64. The driver monitoring computing device of clause 63, wherein the set of sensors includes at least one of an optical sensor, a gyroscopic sensor and an inertial measurement unit.

65. The driver monitoring computing device of any of clauses 55-64, wherein the first sensor is an optical sensor.

66. The driver monitoring computing device of clauses 55-65, wherein generating the fused dataset includes applying an extended Kalman filter (EKF) to the first dataset and the second dataset.

67. The driver monitoring computing device of any of clauses 55-66, wherein outputting the third head pose estimation comprises:

providing the third head pose estimation to a driver monitoring application.

68. The driver monitoring computing device of any of clauses 55-67, wherein the method further comprises:

determining, by the application program executed on the at least one processor, content for a display in response to determining the third head pose estimation of the head of the user.

69. The driver monitoring computing device of clause 68, wherein determining content for the display includes determining content of a subsystem of the driver monitoring computing device that is associated with the third head pose estimation of the head of the user and presenting the determined content on the display.

70. The driver monitoring computing device of clause 69, wherein the first device includes the display, and wherein presenting the determined content on the display includes communicating with the first device to cause the first device to present the determined content on the display of the first device.

71. The driver monitoring computing device of clause 70, wherein the driver monitoring computing device further comprises the display, and wherein presenting the determined content on the display includes communicating with the first device to cause the first device to present the determined content on the display of the first device.

72. The driver monitoring computing device of clause 71, wherein the display is a heads up display (HUD).

C. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including application 106, head pose engine 112, safety engine 113, content engine 114, pose module 202, notification module 204, application programming interface (API) 210, API 220, API 230, head pose engine 222, notification engine 224, head pose engine 232, notification engine 234, interface element generation engine 307, notification module 310, audio system 330, haptic unit 345, API 350, and interface element generation module 352, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. An apparatus of a vehicle, the apparatus comprising:

a non-transitory, machine-readable storage medium storing instructions; and at least one processor coupled to the non-transitory, machine-readable storage medium, the at least one processor being configured to execute the instructions to:

obtain, from a first device, a first dataset indicating a first head pose estimation of a head of a user in each of a first set of images generated by the first device, the first dataset being based on sensor data of a set of sensors of the first device;

obtain a second dataset indicating a second head pose estimation of the head of the user in each of a set of images generated by a first sensor of the vehicle;

generate a fused dataset based on the first dataset and the second dataset, the fused dataset comprising time-aligned data derived from the first dataset and the second dataset, wherein the time-aligned data comprises one or more first elements of the first dataset and one or more second elements of the second dataset, and wherein a difference between a first timestamp associated with the one or more first elements and a second timestamp associated with the one or more second elements is within a predetermined time threshold;

determine a third head pose estimation of the head of the user based on the fused dataset; and output the third head pose estimation.

2. The apparatus of claim 1, wherein the first dataset is generated based on an application of a first trained machine learning process to the sensor data of the set of sensors of the first device.

3. The apparatus of claim 2, wherein the first trained machine learning process is a simultaneous location and mapping (SLAM) algorithm.

4. The apparatus of claim 1, wherein the first device is a head mounted display (HMD) device including the set of sensors, and wherein the at least one processor is further configured to:

obtain, over one or more networks and from the first device, the first dataset.

5. The apparatus of claim 1, wherein the at least one processor is further configured to:

obtain, over one or more networks and from the first device, the sensor data of the set of sensors of the first device;

apply a first trained machine learning process to the sensor data of the set of sensors; and generate the first dataset based on an application of the first trained machine learning process to the sensor data.

6. The apparatus of claim 1, wherein the first device is a HMD device including the set of sensors, and wherein the at least one processor is further configured to:

receive, over one or more networks and from a cloud computing system, the first dataset.

7. The apparatus of claim 6, wherein the first dataset is generated based on an application of a first trained machine learning process to the sensor data of the set of sensors.

8. The apparatus of claim 1, wherein the second dataset is generated based on an application of a second trained machine learning process to the set of images generated by the first sensor of the vehicle.

9. The apparatus of claim 8, wherein the second trained machine learning process is a three-dimensional morphable model (3DMM).

10. The apparatus of claim 1, wherein the set of sensors includes at least one of an optical sensor, a gyroscopic sensor and an inertial measurement unit.

11. The apparatus of claim 1, wherein the first sensor is an optical sensor.

12. The apparatus of claim 1, wherein generating the fused dataset includes applying an extended Kalman filter (EKF) to the first dataset and the second dataset.

13. The apparatus of claim 1, wherein outputting the third head pose estimation comprises providing the third head pose estimation to a driver monitoring application.

14. The apparatus of claim 1, wherein outputting the third head pose estimation comprises determining content for a display in response to the determination of the third head pose estimation of the head of the user.

15. The apparatus of claim 14, wherein determining content for the display includes determining content of a subsystem of the apparatus that is associated with the third head pose estimation of the head of the user and presenting the determined content on the display.

16. The apparatus of claim 15, wherein the first device includes the display, and wherein presenting the determined content on the display includes communicating with the first device to cause the first device to present the determined content on the display of the first device.

17. The apparatus of claim 15, wherein the apparatus further comprises the display, and wherein presenting the determined content on the display includes communicating with the first device to cause the first device to present the determined content on the display of the first device.

18. The apparatus of claim 17, wherein the display is a heads up display (HUD).

19. The apparatus of claim 1, wherein the apparatus comprises the first sensor.

20. The apparatus of claim 1, wherein the first timestamp indicates a first time when the set of sensors of the first device generates or captures the one or more first elements of the first dataset, and wherein the second timestamp indicates a second time when the first sensor of the vehicle generates or captures the one or more second elements of the second dataset.

21. A non-transitory, machine-readable storage medium storing instructions that, when executed by at least one processor of a vehicle, causes the at least one processor to perform operations that include:

obtaining, from a first device, a first dataset indicating a first head pose estimation of a head of a user in each of a first set of images generated by the first device, the first dataset being based on sensor data of a set of sensors of the first device;

obtaining a second dataset indicating a second head pose estimation of the head of the user in each of a set of images generated by a first sensor of the vehicle;

generating a fused dataset based on the first dataset and the second dataset, the fused dataset comprising time-aligned data derived from the first dataset and the second dataset, wherein the time-aligned data comprises one or more first elements of the first dataset and one or more second elements of the second dataset, and wherein a difference between a first timestamp associated with the one or more first elements and a second timestamp associated with the one or more second elements is within a predetermined time threshold;

determining a third head pose estimation of the head of the user based on the fused dataset; and outputting the third head pose estimation.

22. A computer-implemented method performed by an application program executed on at least one processor of a vehicle, the computer-implemented method comprising:

obtaining, from a first device by the application program executed on the at least one processor, a first dataset indicating a first head pose estimation of a head of a user in each of a first set of images generated by the first device, the first dataset being based on sensor data of a set of sensors of the first device;

obtaining, by the application program executed on the at least one processor, a second dataset indicating a second head pose estimation of the head of the user in each of a set of images generated by a first sensor of the vehicle;

generating, by the application program executed on the at least one processor, a fused dataset based on the first dataset and the second dataset, the fused dataset comprising time-aligned data derived from the first dataset and the second dataset, wherein the time-aligned data comprises one or more first elements of the first dataset and one or more second elements of the second dataset, and wherein a difference between a first timestamp associated with the one or more first elements and a second timestamp associated with the one or more second elements is within a predetermined time threshold;

determining, by the application program executed on the at least one processor, a third head pose estimation of the head of the user based on the fused dataset; and outputting the third head pose estimation.

23. The computer-implemented method of claim 22, wherein the first dataset is generated based on an application of a first trained machine learning process to the sensor data of the set of sensors of the first device.

24. The computer-implemented method of claim 23, wherein the first trained machine learning process is a simultaneous location and mapping (SLAM) algorithm.

25. The computer-implemented method of claim 22, wherein the first device is a HMD device including the set of sensors, and wherein the computer-implemented method further comprises: obtaining, over one or more networks and from the first device, the first dataset.

26. The computer-implemented method of claim 22, wherein the computer-implemented method further comprises:

obtaining, over one or more networks and from the first device, the sensor data of the set of sensors of the first device;

applying a first trained machine learning process to the sensor data of the set of sensors, and generating the first dataset based on an application of the first trained machine learning process to the sensor data.

27. The computer-implemented method of claim 22, wherein the first device is a HMD device including the set of sensors, and wherein the computer-implemented method further comprises: obtaining, over one or more networks and from a cloud computing system, the first dataset.

28. The computer-implemented method of claim 22, wherein generating the fused dataset includes applying an extended Kalman filter (EKF) to the first dataset and the second dataset.

29. The computer-implemented method of claim 22, wherein outputting the third head pose estimation comprises:

determining, by the application program executed on the at least one processor, content for a display in response to determining the third head pose estimation of the head of the user.

30. The computer-implemented method of claim 22, wherein outputting the third head pose estimation comprises providing the third head pose estimation to a driver monitoring application.

31. The computer-implemented method of claim 22, wherein the second dataset is generated based on an application of a second trained machine learning process to the set of images generated by the first sensor of the vehicle, and wherein the second trained machine learning process is a three-dimensional morphable model (3DMM).

* * * * *